US009674558B2

(12) United States Patent
Ireton

(10) Patent No.: US 9,674,558 B2
(45) Date of Patent: Jun. 6, 2017

(54) APPARATUS AND METHOD FOR MANAGING DIGITAL VIDEO COMPRESSION SYSTEMS

(71) Applicant: TELEFONAKTIEBOLAGET LM ERICSSON (PUBL), Stockholm (SE)

(72) Inventor: Robert Ireton, Southampton (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/028,268

(22) PCT Filed: Oct. 9, 2013

(86) PCT No.: PCT/EP2013/071062
§ 371 (c)(1),
(2) Date: Apr. 8, 2016

(87) PCT Pub. No.: WO2015/051836
PCT Pub. Date: Apr. 16, 2015

(65) Prior Publication Data

US 2016/0249075 A1 Aug. 25, 2016

(51) Int. Cl.
*H04N 7/173* (2011.01)
*H04N 21/234* (2011.01)
(Continued)

(52) U.S. Cl.
CPC ......... *H04N 21/234* (2013.01); *H04N 19/187* (2014.11); *H04N 19/30* (2014.11);
(Continued)

(58) Field of Classification Search
CPC .... H04N 21/234; H04N 21/431; H04N 21/61; H04N 19/187; H04N 19/30; H04N 19/426
See application file for complete search history.

(56) References Cited

U.S. PATENT DOCUMENTS 6,792,044 B2 * 9/2004 Peng ..................... H04N 19/29 375/240.03
7,324,931 B1 1/2008 Warlock
(Continued)

OTHER PUBLICATIONS

International Search Report dated Jun. 23, 2014, in International Application No. PCT/EP2013/071062, 5 pages.
(Continued)

*Primary Examiner* — Oschta Montoya
(74) *Attorney, Agent, or Firm* — Rothwell, Figg, Ernst & Manbeck, P.C.

(57) ABSTRACT

A method of providing a user interface for managing a digital video compression system comprises the steps of receiving system configuration information relating to the digital video compression system being managed, and partitioning the system into a plurality of transform stages, each transform stage representing a transformation that can be performed on a signal stream as a signal stream flows through the system. A signal stream is represented using one or more signal blocks, wherein a signal block contains information relating to a signal stream within a transform stage. A view of the system is generated, wherein the view of the system is represented as one or more signal streams through the system, and one or more signal blocks along each of said signal streams. The view of the system is modified in response to user commands.

13 Claims, 32 Drawing Sheets

101
101
101
101
103
105
105
105
105
101
103
101
107
107
101
101
109
109
109
109
109
109
109

(51) Int. Cl.

| | |
|---|---|
| ***H04N 21/431*** | (2011.01) |
| ***H04N 21/61*** | (2011.01) |
| ***H04N 19/187*** | (2014.01) |
| ***H04N 19/30*** | (2014.01) |
| ***H04N 19/426*** | (2014.01) |

(52) U.S. Cl.

CPC ......... *H04N 19/426* (2014.11); *H04N 21/431* (2013.01); *H04N 21/61* (2013.01)

(56) References Cited

U.S. PATENT DOCUMENTS

| | | | | |
|---|---|---|---|---|
| 8,005,137 | B2 * | 8/2011 | Han | H04N 19/105 375/240 |
| 8,233,526 | B2 * | 7/2012 | Leonardi | H04N 19/46 348/335 |
| 2005/0138045 | A1 | 6/2005 | Zarrinkoub et al. | |

OTHER PUBLICATIONS

Baotic et al. "Simulation Model of DVB-S2 System" Proceedings ELMAR-2013, pp. 227-231.

Dumic et al. "Simulation Model for the Evaluation of DVB-T System Parameters" Proceedings ELMAR-2010, pp. 225-230.

Bossuet et al. "Etude et modelisation sous Simulink d'une chaine de transmission DVB-S" vol. 7, 2008, 14 pages.

Perez "Simulink Basics Tutorial Starting Simulink Model Files Basic Elements Running Simulations Building System" 2005, 58 pages.

Jaber et al. "Reconfigurable simulator using graphical user interface (GUI) and object-oriented design for OFDM systems" Simulation Modelling Practice and Theory, vol. 19, No. 5, 2011, pp. 1294-1317.

Blaschek "Moses: A Graphics Oriented Software Development Environment" Proceedings of the 15th annual conference on Computer Science, CSC '87, pp. 58-66.

* cited by examiner

APPARATUS AND METHOD FOR MANAGING DIGITAL VIDEO COMPRESSION SYSTEMS

CROSS REFERENCE TO RELATED APPLICATION(S)

This application is a 35 U.S.C. §371 National Phase Entry Application from PCT/EP2013/071062, filed Oct. 9, 2013, designating the United States, the disclosure of which is incorporated herein in its entirety by reference.

TECHNICAL FIELD

The present invention relates to an apparatus and method for managing digital video compression systems, for example digital video broadcasting (DVB) systems, and in particular to a method and apparatus for providing a user interface for managing such systems.

BACKGROUND

Digital video compression systems or broadcast television systems, such as digital video broadcast systems, comprise a number of interconnected devices. The interconnected devices form a network that provides a solution to meet the requirements of a customer, thereby defining a system. The devices forming the network may be provided by a number of different vendors.

The purpose of any of these systems is to transform and re-purpose signals from various sources to various destinations. In doing so, a number of transformations are applied to those signals, for example encoding, transcoding, ad-insertion, multiplexing, de-scrambling, scrambling, joining or splitting of data streams, and so on. The transformations are provided by software applications and separate hardware resources, such as different device chassis or option cards within a chassis.

In older generation systems, one hardware device would typically provide a limited part of the solution and one type of transform function, for example encoding only, but in newer systems a hardware device may typically comprise a number of transform functions within the same hardware resource, for example encoding, transcoding or descrambling all within the same hardware.

An overall system (comprising a number of separate devices) is managed by a control system. The control system collects information from the various devices and provides views to manage the status and configuration of the devices as a system. The user interface of such a control system is typically provided by a native user interface installed as part of the control system.

As the network of interconnected devices may be quite varied, some of the user interfaces are provided by non-native applications such as device web pages. As such, a user is provided with a mixture of different interface views.

The user interfaces need to provide the ability to allow the user to manage interconnections in the system, such as Internet protocol (IP) interconnections, DVB interconnections, encoding functions, multiplexing functions, and all manner of different parameters.

In some networks, the system can be managed entirely by the control system. Whist the user experience is improved in such a scenario because the user has access to a single user interface, the manner in which the system is configured is typically equipment centric or transport stream centric.

For equipment centric configuration and monitoring in non-native control systems, a user manages each device independently using the device's own user interface (such a web interface being provided for each device). The user normally visualizes a map of hardware in the system and their physical connections, and manages each device in-turn by using an interface which is specific to each device. This is an equipment based paradigm.

For a transport stream centric approach, the configuration is abstracted to the input and or output of the system. This is typically viewed using one or more tree based views since a transport stream has a logical hierarchy structure. This is a transport stream paradigm.

Where the control system provides a graphical 'map' of the devices in the system, illustrating each device and its connection to the next device(s), this hardware view can also be used for monitoring purposes.

As a result of the varied user interfaces provided by the system, the user interactions (user experience) is disjointed. That is, the user must view a number of different user interfaces, configure each device in turn or partly configure the system using the native control user interface provided by the control system.

Where the control system provides an equipment centric approach, the user experience remains disjointed. Data may need to be entered into different device user interfaces, thus having the disadvantage of requiring duplicate data entry, and each equipment type has a different approach or abstraction with managing its part of the overall system configuration.

Where the approach is transport stream centric, the configuration and monitoring still does not provide a way of managing (configuring or monitoring) the system across all the transform functions in a single view—a number of views may need to be launched to achieve a task. Furthermore, a user is typically forced to hunt into various property pages and tabs to locate properties to achieve some specific task.

FIG. 1 is an example of the equipment centric approach, whereby lists of network devices (for example input nodes 101, switches/routers 103, encoders/transcoders 105, multiplexers 107, output nodes 109) and their physical connection are illustrated. These views are offered on the user interface in the form of a map of the hardware in the system, as shown in FIG. 1, but this has the disadvantage of being limited to physical devices and their interconnections.

SUMMARY

It is an aim of the present invention to provide a method and apparatus which obviate or reduce at least one or more of the disadvantages mentioned above.

According to a first aspect of the present invention there is provided a method of providing a user interface for managing a digital video compression system. The method comprises the steps of receiving system configuration information relating to the digital video compression system being managed, and partitioning the system into a plurality of transform stages, each transform stage representing a transformation that can be performed on a signal stream as a signal stream flows through the system. The method further comprises the steps of representing a signal stream using one or more signal blocks, wherein a signal block contains information relating to a signal stream within a transform stage. A view of the system is generated, wherein the view of the system is represented as one or more signal streams through the system, and one or more signal blocks along each of said signal streams. The method further comprises the step of modifying the view of the system in response to user commands.

This method has an advantage in that it presents a conceptual model of how signals are passed through transport stages and signal blocks of the system, i.e. based on the purpose of the system, rather than merely showing hardware interconnections.

According to another aspect of the present invention there is provided an apparatus for providing a user interface for managing a digital video compression system. The apparatus comprises a receiving unit adapted to receive system configuration information relating to the digital video compression system being managed. A processing unit is configured to partitioning the system into a plurality of transform stages, each transform stage representing a transformation that can be performed on a signal stream as a signal stream flows through the system. The processing unit is further adapted to represent a signal stream using one or more signal blocks, wherein a signal block contains information relating to a signal stream within a transform stage, and generate a view of the system, wherein the view of the system is represented as one or more signal streams through the system, and one or more signal blocks along each of said signal streams. The processing unit is further adapted to modify the view of the system in response to user commands.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
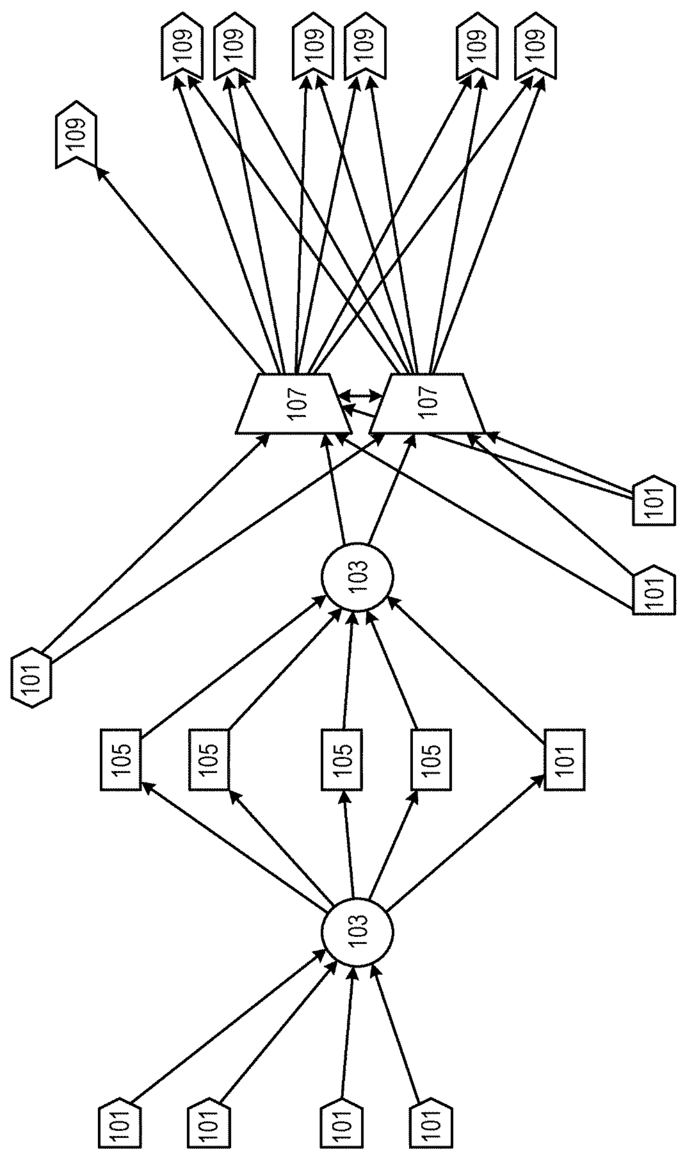
FIG. 1 shows an example of a user interface according to the prior art.
Figure 2:
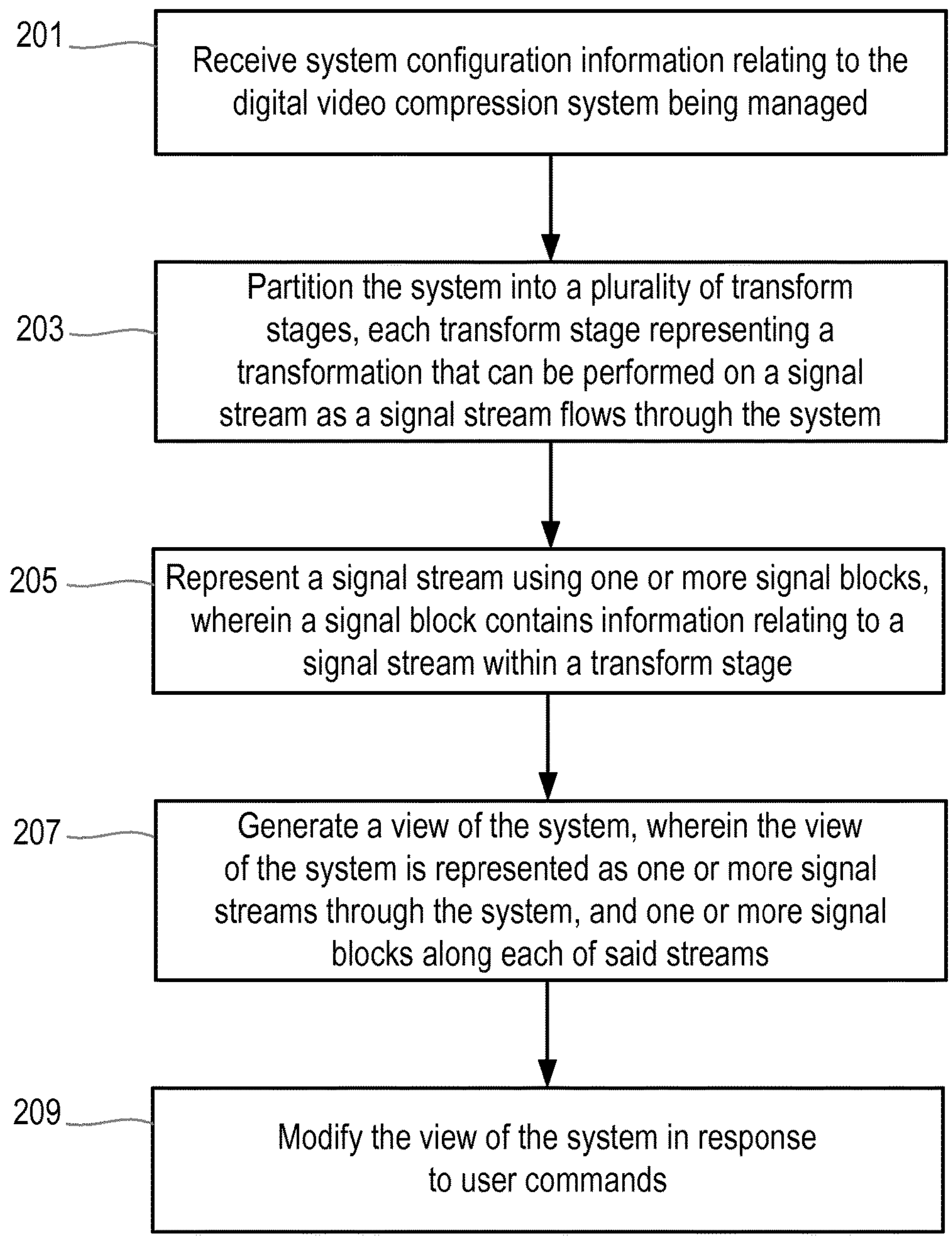
FIG. 2 shows a method according to an embodiment of the present invention.

FIG. 1 shows a method according to an embodiment of the present invention, for providing a user interface for managing a digital video compression system. The method comprises the step of receiving system configuration information relating to the digital video compression system being managed, step 201. In step 203 the system is partitioned into a plurality of transform stages, each transform stage representing a transformation that can be performed on a signal stream as a signal stream flows through the system. In step 205, a signal stream is represented using one or more signal blocks, wherein a signal block contains information relating to a signal stream within a transform stage. A view of the system is generated, step 207, wherein the view of the system is represented as one or more signal streams through the system, and one or more signal blocks along each of said signal streams. The view of the system is modified, step 209, in response to receiving user commands.

The method simplifies the complexity of many signals being managed through a system, and provides a view of the system which relates signal management to the intended purpose of the system, rather than the interconnection of hardware.

This has the advantage of offering a conceptual model of how signals are passed through transport stages of the system, i.e. based on the purpose of the system rather than mere hardware interconnections.

Figure 3:
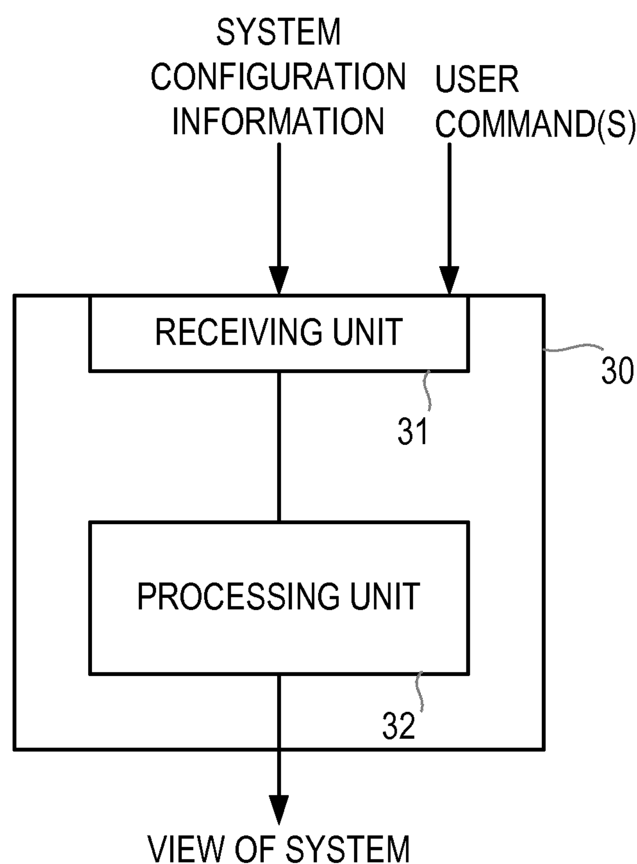
FIG. 3 shows an apparatus according to an embodiment of the present invention.

FIG. 3 shows an apparatus 30 according to an embodiment of the present invention, for providing a user interface for managing a digital video compression system. The apparatus comprises a receiving unit 31 adapted to receive system configuration information relating to the digital video compression system being managed. The apparatus 30 also comprises a processing unit 32 configured to partitioning the system into a plurality of transform stages, each transform stage representing a transformation that can be performed on a signal stream as a signal stream flows through the system. The processing unit is also configured to represent a signal stream using one or more signal blocks, wherein a signal block contains information relating to a signal stream within a transform stage. Furthermore, the processing unit 32 is configured to generate a view of the system, wherein the view of the system is represented as one or more signal streams through the system, and one or more signal blocks along each of said signal streams, and modify the view of the system in response to user commands.

A more detailed explanation of the method and apparatus of the present invention will now be provided with reference to FIGS. 4 to 29, and in particular how the view of a system is generated after partitioning the system and representing the system as described above, and how the system view can then be modified in response to user commands. These Figures visualize the interactions and concept of a user interface according to embodiments of the present invention, for configuring and/or monitoring a digital video compression system.

Figure 4:
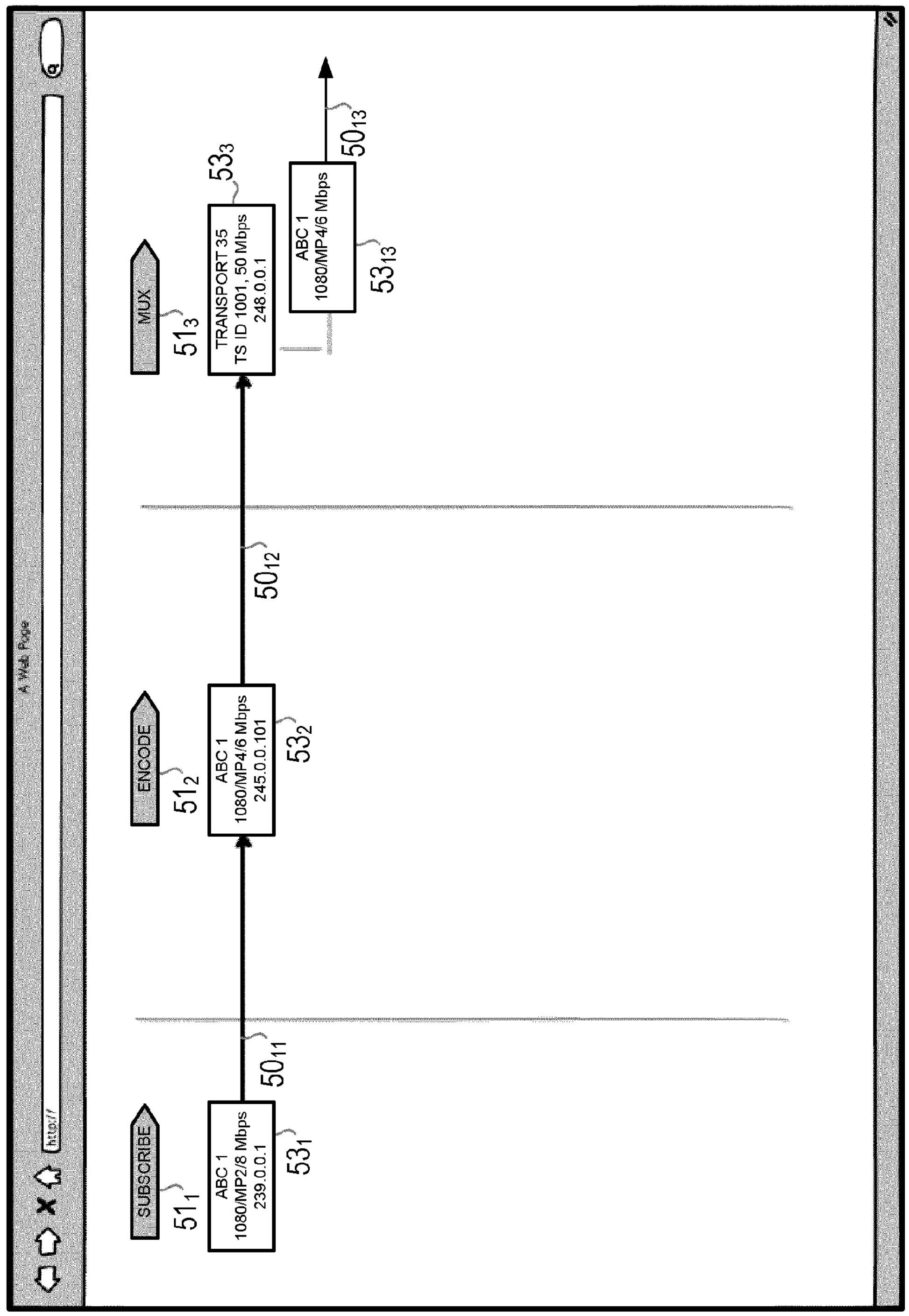
FIG. 4 shows an example of a system view of a user interface according to an embodiment of the invention.
Figure 5:
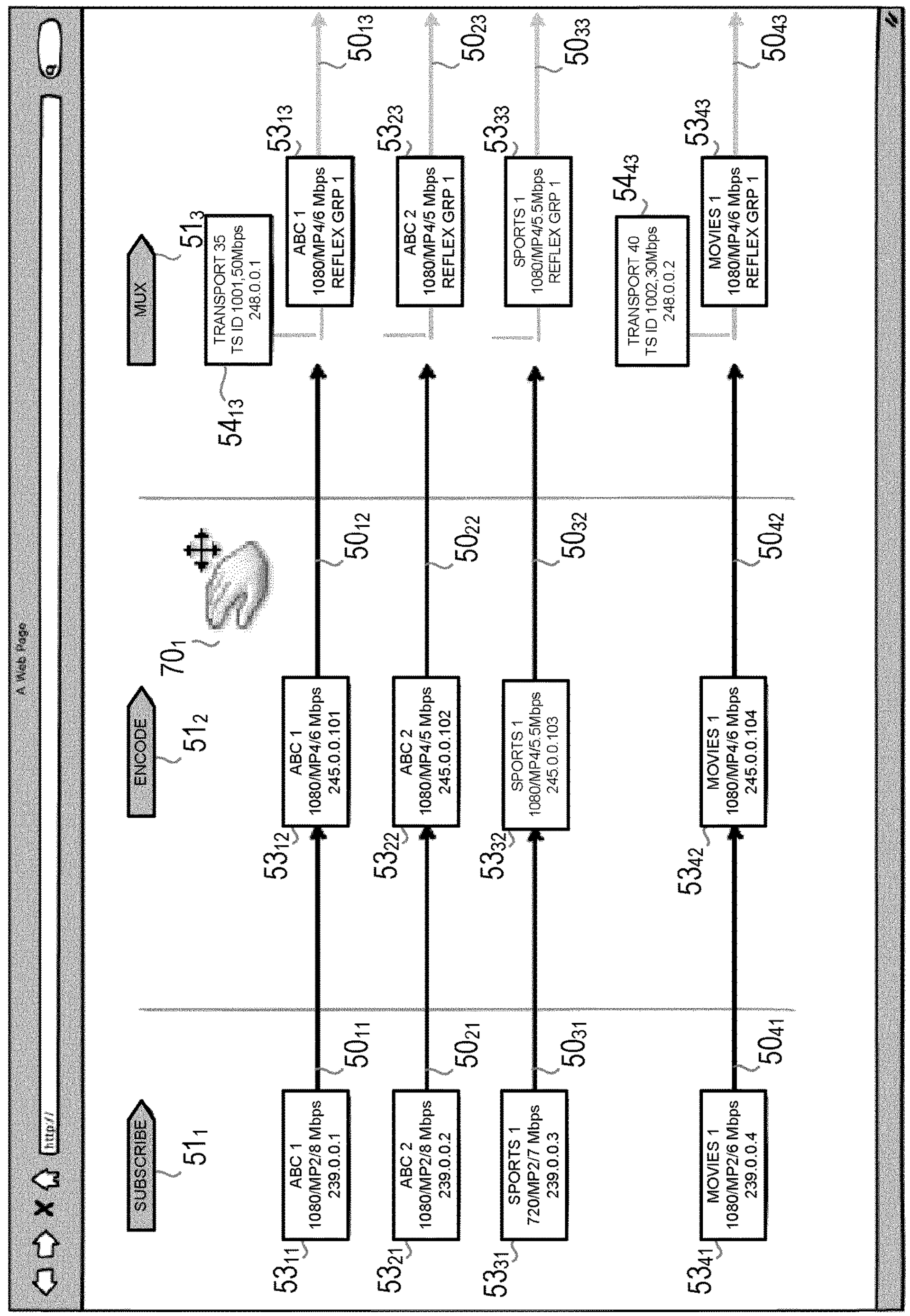
FIG. 5 shows an example of a system view of a user interface according to an embodiment of the invention, and an example of how the system view can be modified in response to user commands.

Referring to FIG. 4, the step of generating a view of the system may comprise, according to an embodiment of the invention, the steps of arranging the transform stages 51 as a series of horizontal stages (51$_1$ to 51$_3$ in the example of FIG. 4), and arranging the signal blocks 53 as vertical columns of signal blocks within a transform stage. The transform stages of the example of FIG. 4 comprise a "subscribe" transform stage 51$_1$, an "encode" transform stage 51$_2$, and a "multiplexing" (mux) transform stage 51$_3$. It is noted that any number of transform stages may be provided, and relating to any mixture or combination of transform functions. In the example of FIG. 4 only one row of signal block 53$_1$ is shown in the column corresponding to transform stage 51$_1$, whereas the example of FIG. 5 shows a plurality of rows of signal blocks 53$_{11}$ to 53$_{41}$ for the column corresponding to transform stage 51$_1$, and likewise for the other transform stages.

The embodiments of the invention provide a mapping view approach, with the physical and logical signals passing through transform stages in the system, and each signal stream represented by one or more signal blocks along each signal stream. Such an arrangement enables a user to pan and/or zoom to enable a small screen to view the system and promote a spatial awareness to the user.

In such a method or apparatus the view of the system is modified by panning along a path of a signal stream in response to receiving a panning command from a user.

As the user pans and zooms through the graphical signal flows in the system, detail is added or removed depending on the zoom level (or hierarchical level). In addition, the content of the view is altered via the user selecting different information layers in the system, as will be explained below.

The view of the system shown in FIG. 4 comprises a single signal stream 50$_1$, for example a video stream "ABC 1" passing though transform stages 51$_1$ to 51$_3$, (the signal stream 50$_1$ being identified as 50$_{11}$ to 50$_{13}$ in the respective transform stages 51$_1$ to 51$_3$). The signal blocks 53$_1$ to 53$_3$ visualize the processing that is performed on the signal stream 50$_1$ in each corresponding transform stage 51$_1$ to 51$_3$. In the example each signal block is shown as displaying a service identifier for identifying the service being provided by a signal stream (for example ABC 1, ABC2, SPORT 1, MOVIES 1, etc), equipment device information identifying the transform operation being performed on the signal stream by one or more equipment devices (for example encoder, mux, splitter, etc), and internet protocol multicast information (for example IP multicast address information).

For example, the signal block 53$_1$ is shown as displaying a service identifier "ABC 1", equipment device information corresponding to "1080/MP2/8 Mbps" (i.e. identifying that the video signal stream is a 1080 high definition signal stream in MP2 format, and having a data rate of 8 Mbps), and internet protocol multicast information "239.0.0.1" (which comprises an IP multicast address corresponding to this signal block 53$_1$). Signal block 53$_2$ shows that in transform stage 51$_2$, where an encoding function is performed, the signal stream 50$_{11}$ undergoes an encoding function from MP2 to MP4 format, with the data rate being converted from 8 Mbps to 6 Mbps. Thus, signal block 53$_2$ displays a service identifier "ABC 1" for identifying the signal stream, equipment device information corresponding to "1080/MP4/6 Mbps" (i.e. identifying that the video signal stream is a 1080 high definition signal stream in MP4 format, and having a data rate of 6 Mbps), and internet protocol multicast information corresponding to "245.0.0.101" (which comprises an IP multicast address corresponding to this signal block 53$_2$). Signal block 53$_3$ shows that in transform stage 51$_3$, where a multiplexing function is performed, the signal stream 50$_{12}$ is multiplexed with one or more other signals (not shown). The signal block 53$_3$ therefore displays information corresponding to the multiplexing information. It is noted that a transport stream is a logical collection of services and other data. A transport stream may be carried over a number of different medium such as IP or RF. It is regarded as a parent item for services and this is shown in this view, as a parent signal block. Associated with the signal block 53$_3$ is a child signal block 53$_{13}$ corresponding to the signal stream being multiplexed. As such, the child signal block 53$_{13}$ contains a service identifier "ABC 1" for identifying the signal stream, and equipment device information corresponding to "1080/

MP4/6 Mbps" (i.e. identifying that the video signal stream is a 1080 high definition signal stream in MP4 format, and having a data rate of 6 Mbps).

From the above it can be seen that embodiments of the invention are configured such that a signal block comprises information including any one or more of: a service identifier for identifying the service being provided by a signal stream (e.g. ABS, Sport 1, Movies 1); equipment device information identifying the transform operation being performed on the signal stream by one or more equipment devices (e.g. encoder, mux, splitter, etc); and internet protocol multicast information for the signal stream (e.g. IP multicast address information).

FIG. 5 shows a view comprising a plurality of signal streams, for example a first signal stream $\mathbf{50}_1$ corresponding to a television video signal ABC 1, a second signal stream $\mathbf{50}_2$ corresponding to a television video signal ABC 2, a third signal stream $\mathbf{50}_3$ corresponding to a television video signal SPORTS 1, and a fourth signal stream $\mathbf{50}_4$ corresponding to a video signal MOVIES 1.

The system is partitioned into a plurality of transform stages $\mathbf{51}_1$ to $\mathbf{51}_3$, each transform stage representing a transformation that can be performed on a signal stream 50 as a signal stream flows through the system. Each signal stream 50 is represented using one or more signal blocks 53, wherein a signal block contains information relating to a signal stream within a transform stage. The view of the system is therefore represented in FIG. 5 as one or more signal streams $\mathbf{50}_1$ to $\mathbf{50}_4$ through the system, and one or more signal blocks 53 along each of said signal streams $\mathbf{50}_1$ to $\mathbf{50}_4$.

FIG. 5 shows how the system view can be modified in response to user commands $\mathbf{70}_1$. The user commands allow a user to pan through the system view in any direction, for example to view what functions are performed on each signal stream upstream or downstream of a particular view, or to determine what other signal streams may exist above or below the current view of signal streams. The user command can cause the system view to move in any direction, including upwards, downwards, leftwards, rightwards, or in any oblique angle. The user commands may be received from any form of source, for example a user clicking and dragging a mouse, or commands entered via a touch screen display, or voice commands received from a user, or gesture commands from a user, or any combination of these.

Figure 6:
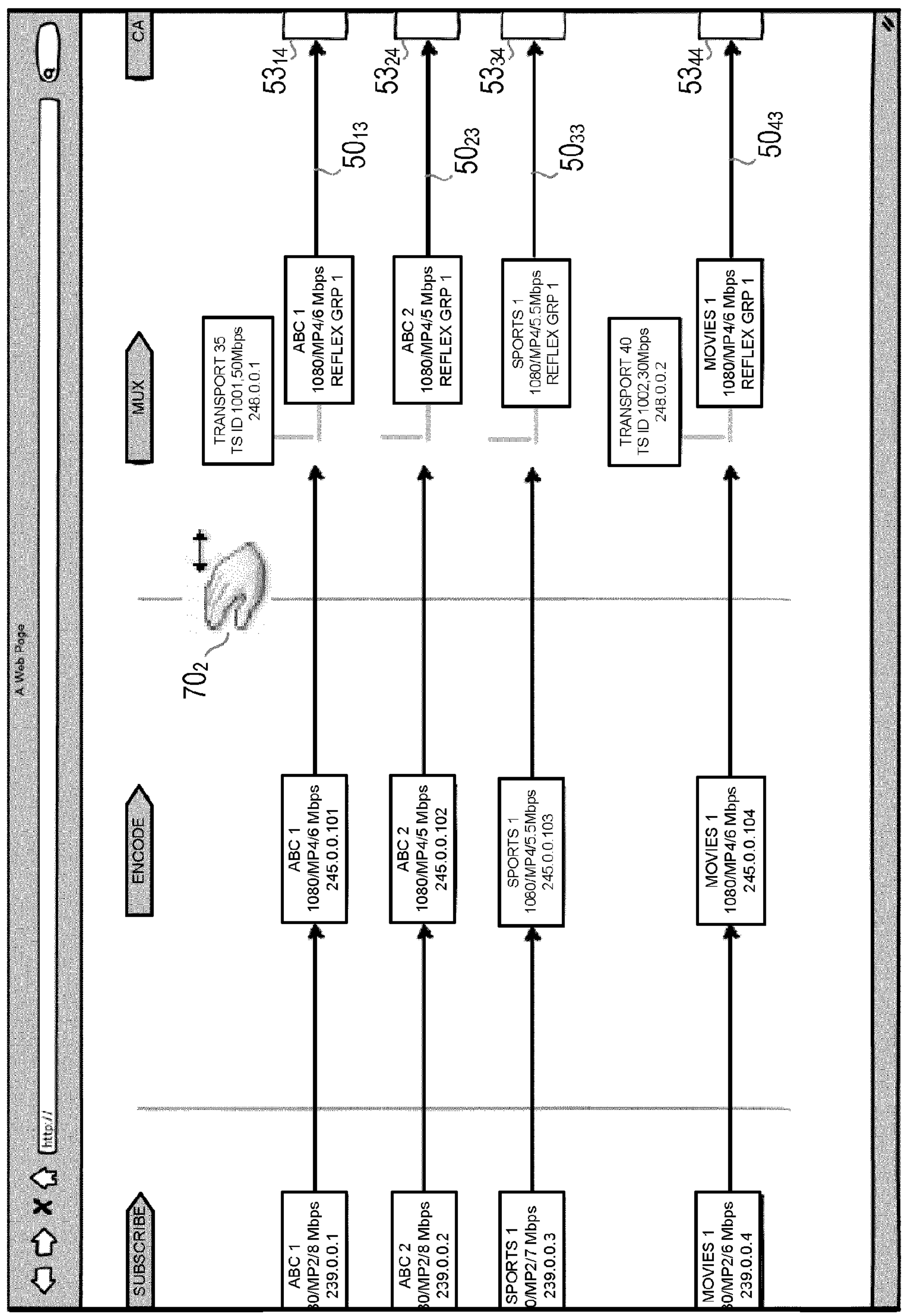
FIG. 6 shows an example of a system view of a user interface according to an embodiment of the invention, and an example of how the system view can be modified in response to user commands.

FIG. 6 shows an example of a system view whereby a user command $\mathbf{70}_2$ is received to display a visualization of what happens to the signal streams downstream of the system view shown in FIG. 5. As such, the signal blocks $\mathbf{53}_{14}$ to $\mathbf{53}_{44}$ are represented in the system view. Panning further in the downstream direction will identify further information about the signal blocks $\mathbf{53}_{14}$ to $\mathbf{53}_{44}$, as will be seen from the Figures below (for example FIG. 8).

Figure 7:
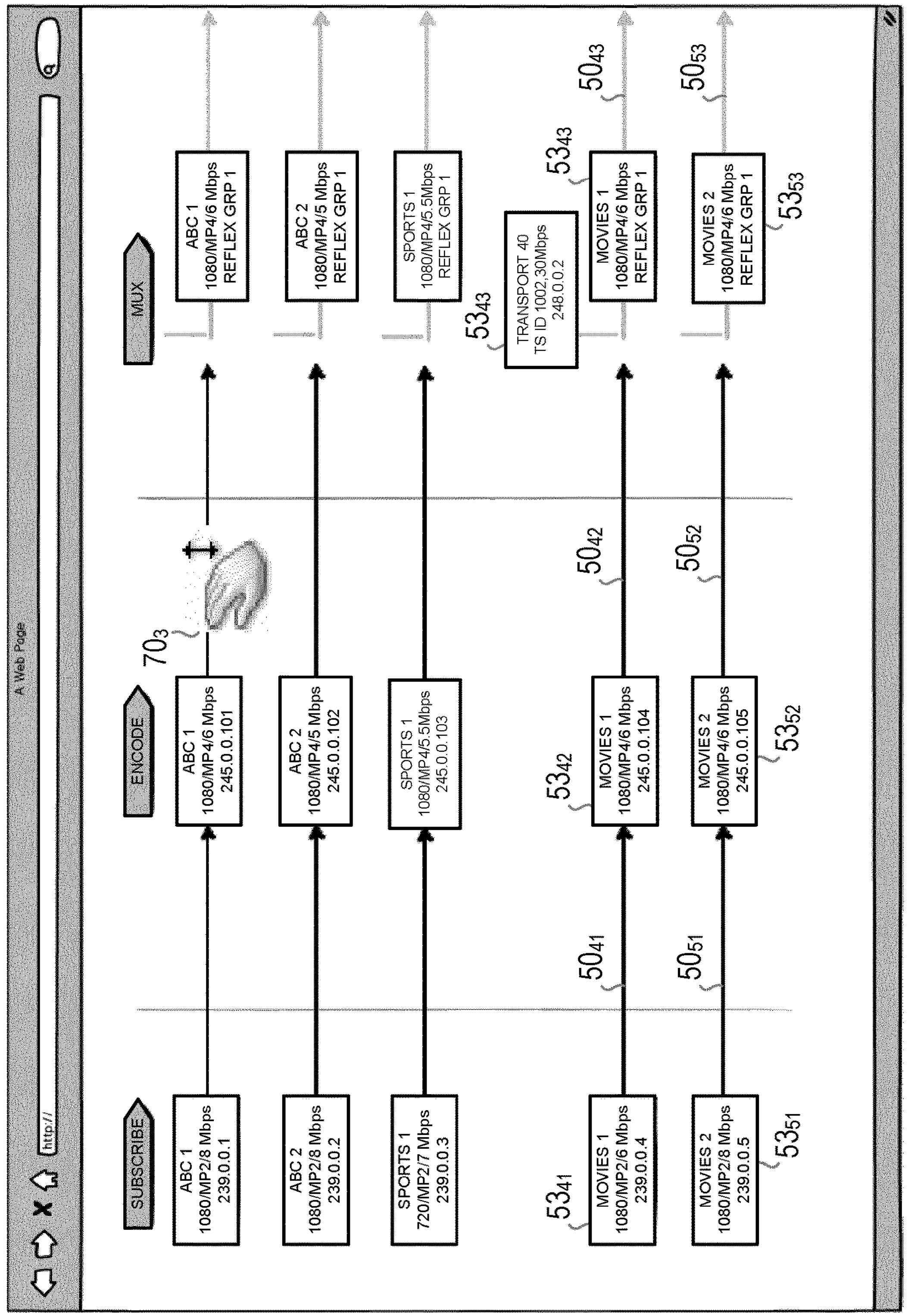
FIG. 7 shows an example of a system view of a user interface according to an embodiment of the invention, and an example of how the system view can be modified in response to user commands.

FIG. 7 shows an example of a system view whereby a user command $\mathbf{70}_3$ is received to display a visualization of what happens to the signal streams below the system view shown in FIG. 5. As such, a signal stream $\mathbf{50}_5$ is displayed, corresponding to a signal stream MOVIES 2.

Figure 8:
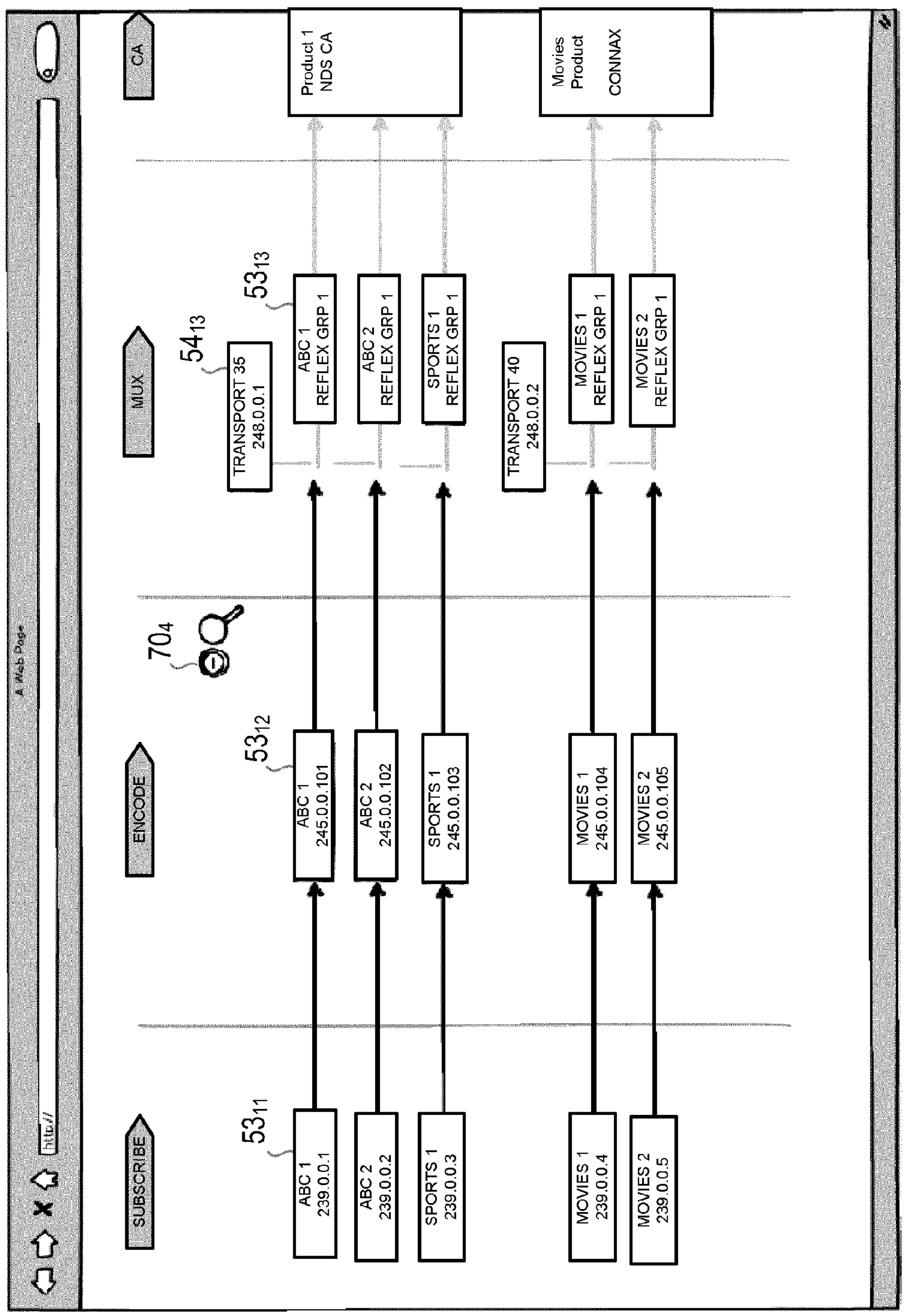
FIG. 8 shows an example of a system view of a user interface according to an embodiment of the invention, and an example of how the system view can be modified to show different hierarchical levels in response to user commands.

FIG. 8 shows an example of a system view whereby a user command $\mathbf{70}_4$ corresponding to a zoom-out command is received to display more signal streams in a given system view compared to the example in FIG. 5. Since more signal streams and transform stages are shown in this view (i.e. five signal streams compared to the four of FIG. 5, and four transform stages compared to the three of FIG. 5), it is noted that less detail can be displayed in each signal block. For example, in FIG. 8 a signal block $\mathbf{53}_{11}$ displays only the signal stream identifier ABC1 and the multicast identifier 239.0.0.1. It is noted that the user can configure which information is omitted or displayed at different zoom-out and zoom-in levels. Each zoom level represents a different hierarchical layer.

Figure 9:
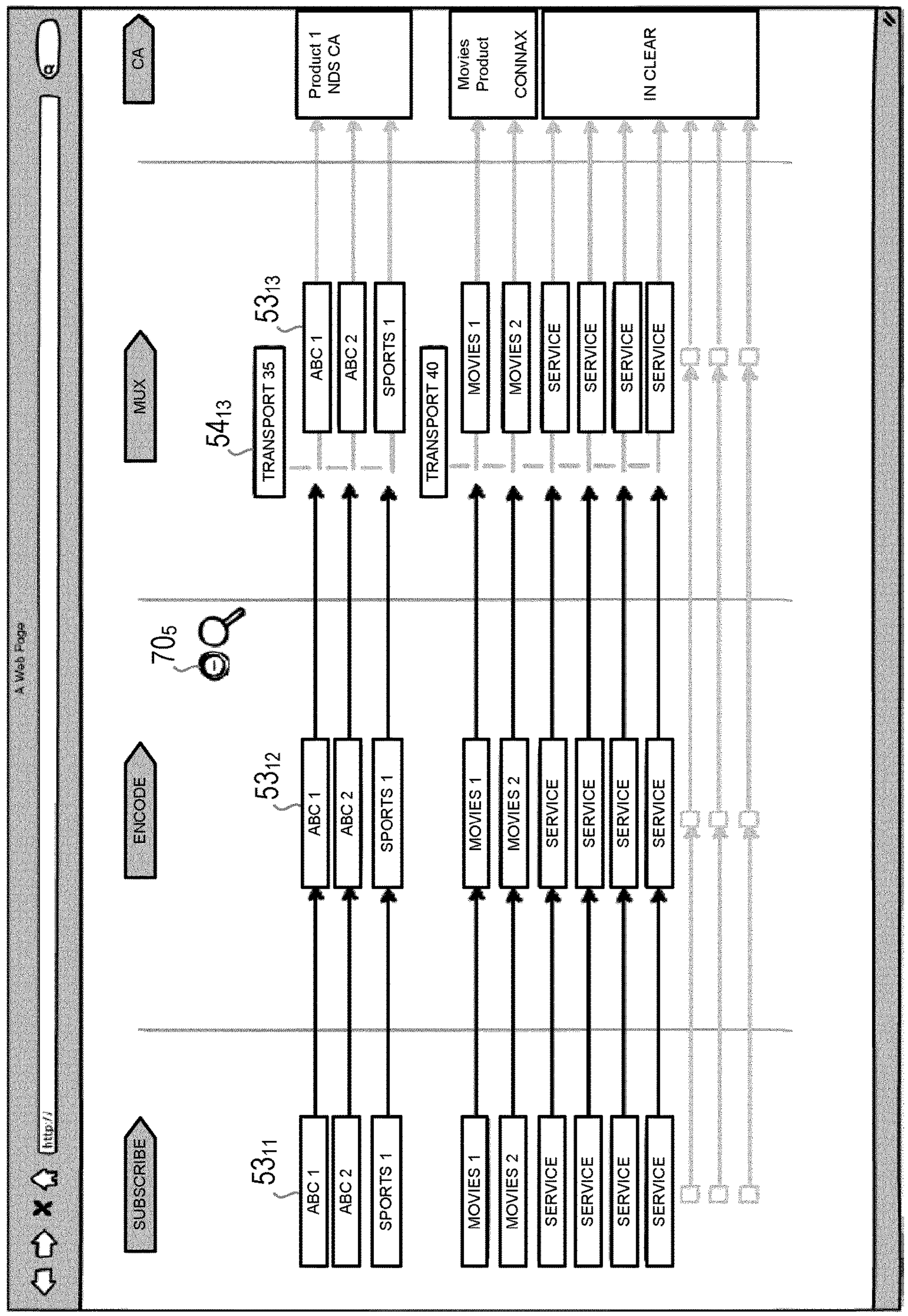
FIG. 9 shows an example of a system view of a user interface according to an embodiment of the invention, and an example of how the system view can be modified to show different hierarchical levels in response to user commands.

FIG. 9 shows an example of a system view whereby a user command $\mathbf{70}_5$ corresponding to a further zoom-out command is received to display even more signal streams in a given system view compared to the example in FIG. 5. Since even more signal streams are shown in this view (i.e. nine signal streams compared to the four of FIG. 5), it is noted that even less detail can be displayed in each signal block. For example, in FIG. 9 a signal block $\mathbf{53}_{11}$ displays only the signal stream identifier ABC1. As above, it is noted that the user can configure which information is omitted or displayed at different zoom-out and zoom-in levels (hierarchical layers), and the user may therefore choose to display a different piece of information when limited information is available.

From the above it can be seen that the apparatus and method of the present invention can provide a plurality of hierarchical layers, wherein a first level of information is displayed in a signal block at a first hierarchical layer, and a second level of information displayed in a signal block at a second hierarchical layer.

This has the advantage of enabling each hierarchical layer to provide a different degree of detail for the various transform stages, i.e. as a user zooms in and out of the system view.

The system view in such an embodiment is modified by switching between hierarchical layers in response to receiving a user command, i.e. in response to receiving zoom-in or zoom-out user commands from a user.

As an additional or alternative feature to FIGS. 8 and 9, it is noted that the user may also configure the system to have different display font sizes when zooming in/out. For example, when receiving a zoom-in command from the user, the system may be configured to initially display the same level of detail in each signal block as a previous zoom layer, but with the information initially displayed at a different font size (i.e. a smaller font size), before beginning to omit information when zooming in further.

Figure 10:
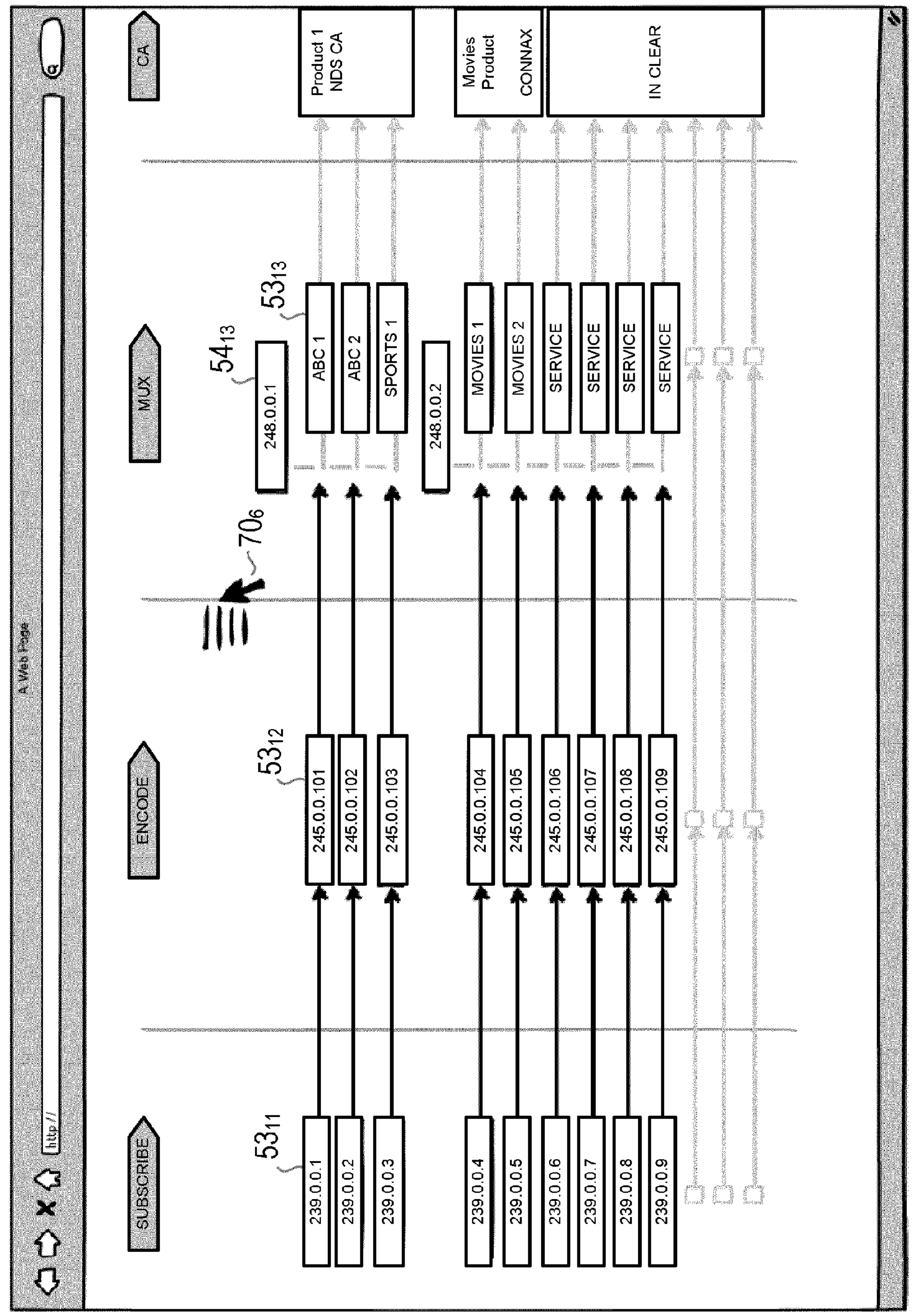
FIG. 10 shows an example of a system view of a user interface according to an embodiment of the invention, and an example of how the system view can be modified to show different information levels in response to user commands.

FIG. 10 shows how a user can select, at a particular layer, what information is displayed in each of the signal blocks. For example, in FIG. 10 a signal block $\mathbf{53}_{11}$ displays only the multicast IP address, rather than displaying just the service identifier ABC1 as shown in FIG. 9. As such, a user can select different layers to alter the logical perspective of the signal flow and its blocks. This may involve changing the details of the signal blocks and may also involve re-arranging the different signal streams into different groupings.

From the above it can be seen that an apparatus and method according to embodiments of the invention may further comprise providing a plurality of information layers, wherein a first type of information is displayed in a signal block at a first information level, and a second type of information displayed in a signal block at a second information level.

The view of the system can be modified by switching between information layers in response to receiving a user command.

The has the advantage of enabling each information layer to provide a different type of information for the various signal blocks (e.g. DVB service, IP, stat mux, etc.), which can be switched in response to receipt of a user command.

Figure 11:
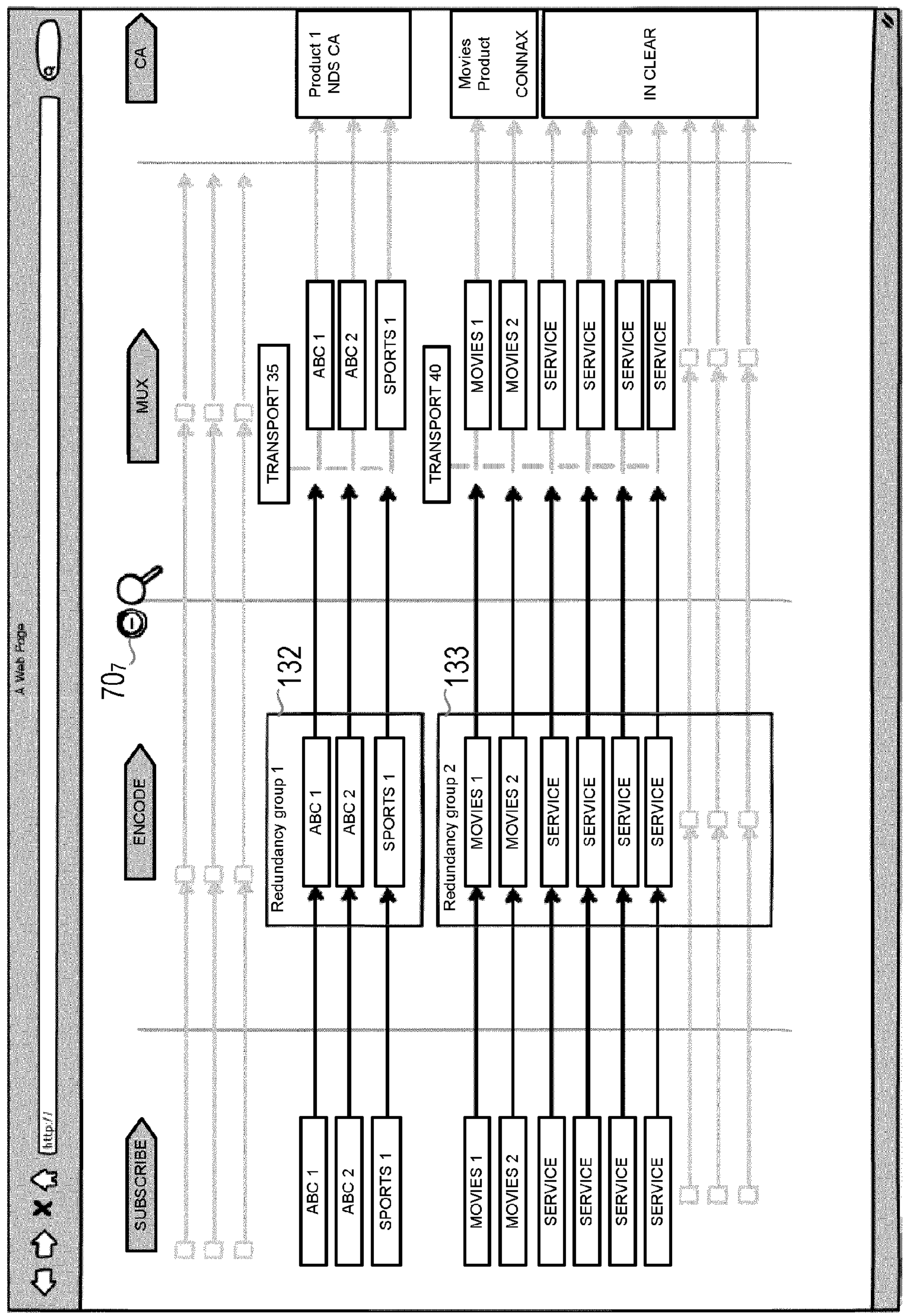
FIG. 11 shows an example of a system view of a user interface according to an embodiment of the invention, and an example of how redundancy groups can be illustrated.

FIG. 11 shows how redundancy groups can be displayed, either by layer selection or by zooming out further. FIG. 11 shows a first redundancy group 132 and a second redundancy group 133.

Thus, in such an embodiment the step of modifying the view of the system comprises switching to display redundancy groups in response to user commands, either by selecting an information layer (i.e. selecting layers) or selecting a hierarchical layer (i.e. zooming out further commands).

Figure 12:
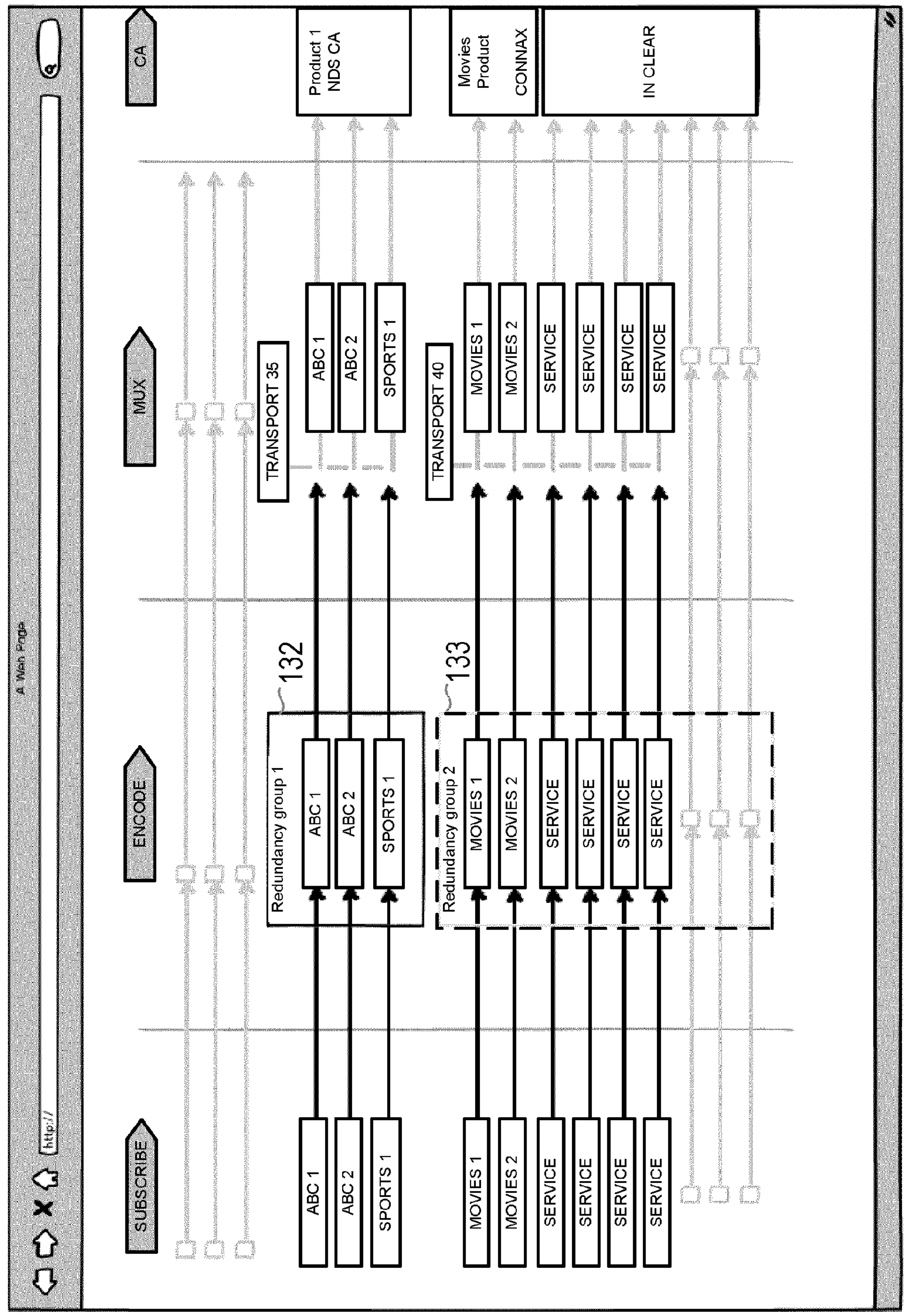
FIG. 12 shows an example of a system view of a user interface according to an embodiment of the invention, and an example of how redundancy protection can be illustrated.

In FIG. 12, the system can be configured to show redundancy protection in the view (with no spare devices as shown in the example, or with spare devices), for example by adding a border colour or other visual effect to a redundancy group (for example illustrated in FIG. 12 using a solid line for redundancy group 132 and a dashed line for redundancy group 133). Any form of visual effect may be used, including different colours as noted above.

Thus, in such an embodiment the step of modifying the view of the system comprises switching to display redundancy protection where no spare equipment devices are available and hence no protection currently available.

With this type of redundancy group arrangement, a border surrounds a group of cells or signal blocks that collectively use the same redundancy group. A redundancy group defines a set of devices that can be used for a particular set of transform functions.

Figure 13:
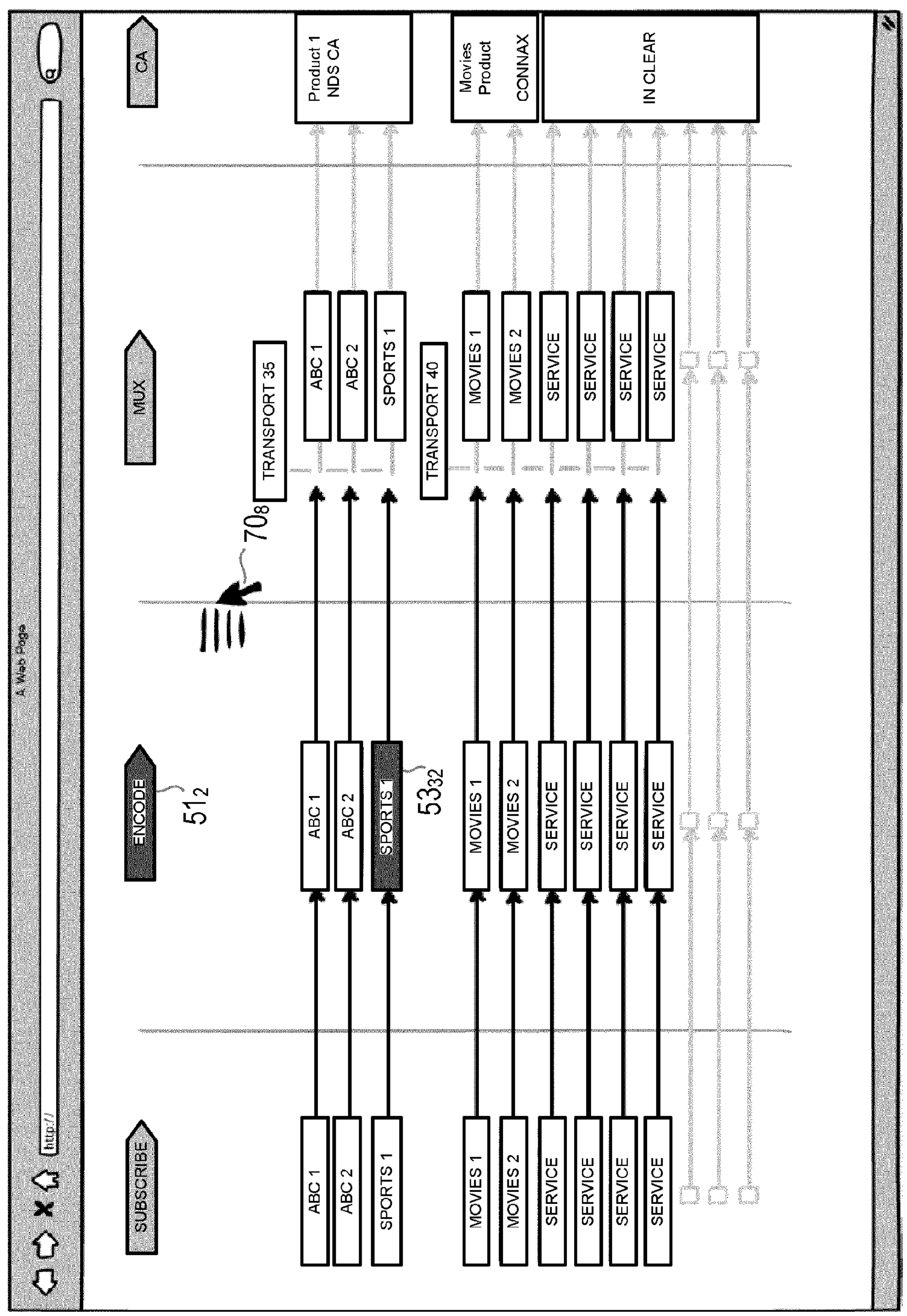
FIG. 13 shows an example of a system view of a user interface according to an embodiment of the invention, and an example of how operational efficiency or health can be illustrated.

FIG. 13 illustrates how the system may be configured, in response to a user command $\mathbf{70}_8$, such that a layer is switched to show a health status of a service. For example, the worst severity of a signal block is shown in the transform stage heading. This enables a user to quickly identify a signal block that requires attention. For example, if the signal block $\mathbf{53}_{32}$ of FIG. 13 has the worst health status, the signal block $\mathbf{53}_{32}$ can be displayed using a different visual effect, such as a different colour or a blinking effect, and the corresponding header of a transform stage $\mathbf{51}_2$ also displayed with a visual effect, such as a different colour or blinking effect.

In such an embodiment the step of modifying the view of the system comprises using different information layers to represent a different level of operational efficiency (i.e. health) of a signal block, and highlighting a signal block having an operational efficiency which is below a threshold value (e.g. at risk).

Figure 14:
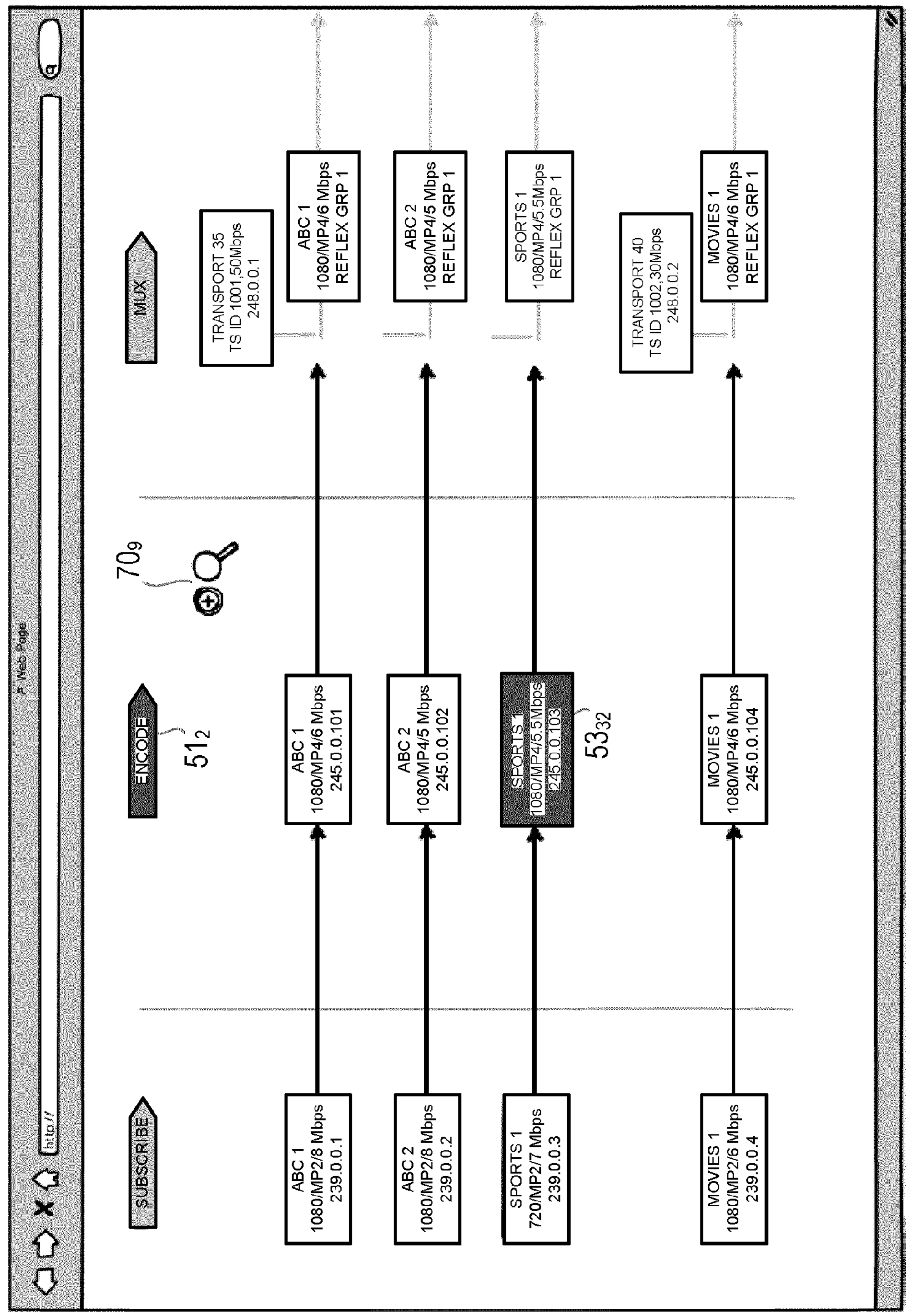
FIG. 14 shows an example of a system view of a user interface according to an embodiment of the invention, and how a user can change hierarchical levels to diagnose an operational efficiency or health problem.

Thus, referring to FIG. 14, when the attention of a user is brought to a signal block $\mathbf{53}_{32}$ in this way, upon receiving a user command $\mathbf{70}_9$ to zoom-in to that signal block $\mathbf{53}_{32}$, further details of the signal block $\mathbf{53}_{32}$ having the poor health status can be displayed, thus enabling a user to perform a more detailed analysis and any diagnostics that may be required. A user command may comprise a user selecting a signal block header, and in response the system being configured to take the user to the unhealthy blocks in a round robin fashion.

Figure 15:
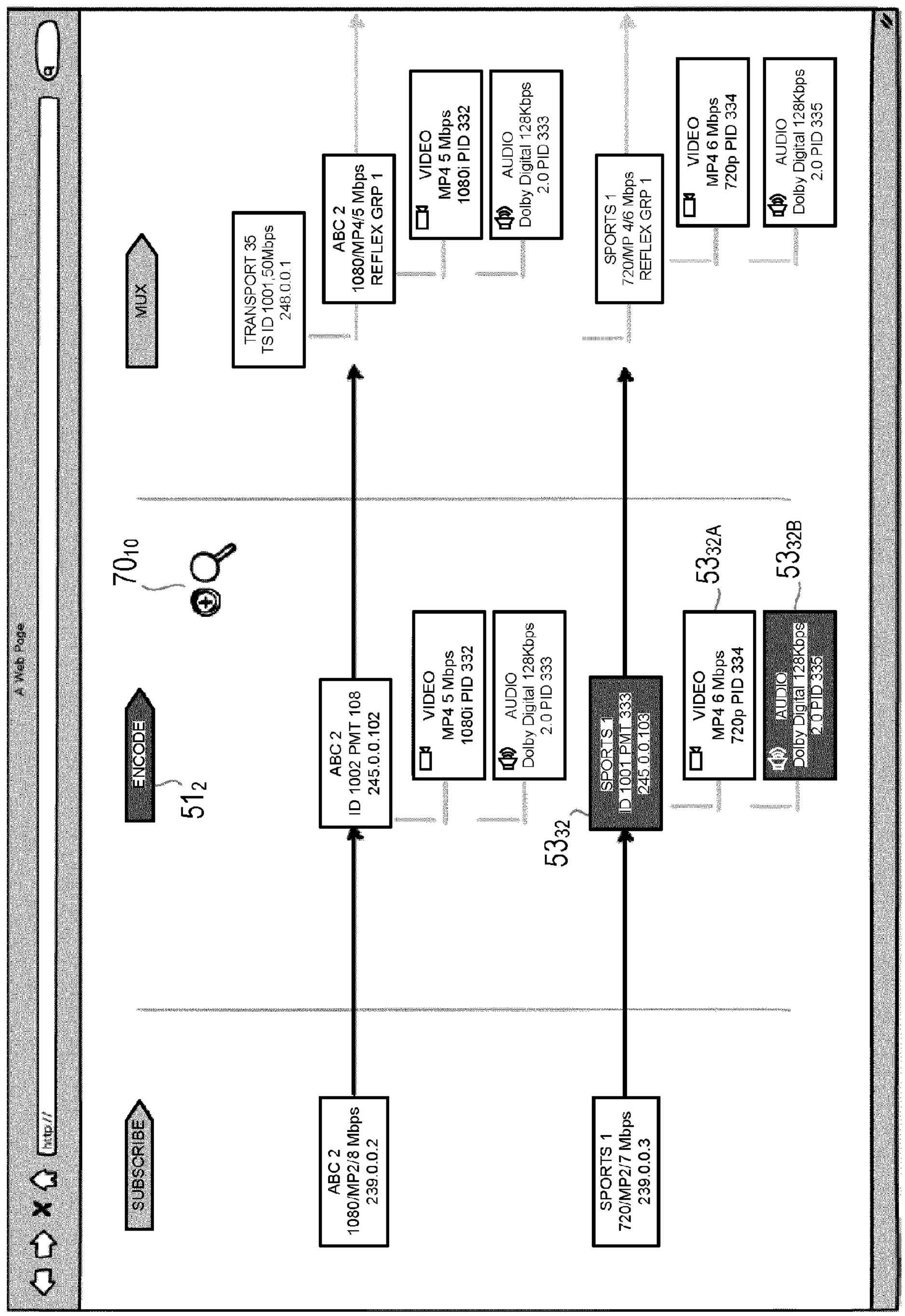
FIG. 15 shows an example of a system view of a user interface according to an embodiment of the invention, and how parent and child information can be illustrated.

FIG. 15 shows how, upon receiving a user command $\mathbf{70}_{10}$ to zoom-in further to signal block $\mathbf{53}_{32}$, yet further details of the signal block $\mathbf{53}_{32}$ having the poor health status can be displayed, and child signal blocks $\mathbf{53}_{32A}$ and $\mathbf{53}_{32B}$ associated with signal block $\mathbf{53}_{32}$ to be displayed, thus enabling a user to perform an even more detailed analysis and any diagnostics that may be required. Child signal blocks $\mathbf{53}_{32A}$ and $\mathbf{53}_{32B}$ correspond to service child components corresponding to the parent signal block $\mathbf{53}_{32}$.

From FIGS. 13, 14 and 15 above it can be seen that a user can initially zoom-out and then pan the system view in order to locate a transform stage and a corresponding signal block that requires attention, and then once identified, zoom-in to the signal block in question in order to perform the required diagnostics.

The embodiments of FIGS. 13 to 15 therefore provide status information which is displayed on each signal block if the signal is in error or below a certain operational efficiency within the transform stage. This can be displayed via a visual effect, such as colorization of the signal block as noted above. The status information may also be propagated to a header block of a transformation stage, to further enhance the visual warning to the user. The system can be configured such that the highest severity alarm color takes precedence on the transform header block.

Figure 16:
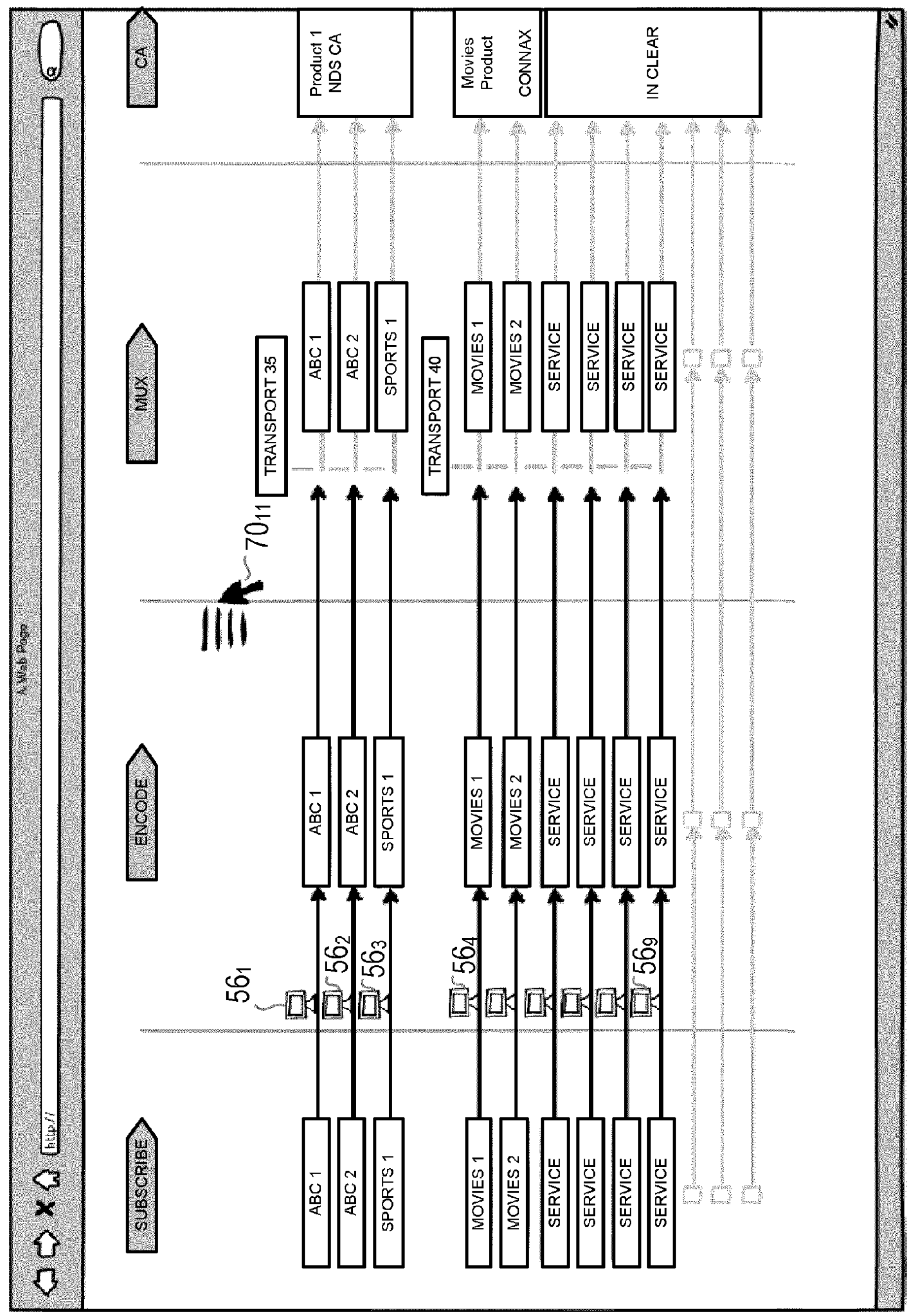
FIG. 16 shows an example of a system view of a user interface according to an embodiment of the invention, and an example of how video thumbnails can be illustrated.

FIG. 16 illustrates how the system can be configured, in response to receiving a user command $\mathbf{70}_{11}$, to switch layers in order to display video thumbnails 56 for one or more signal streams. In such an embodiment the step of modifying the view of the system comprises displaying video thumbnails of one or more signal stream. For example, the input content into encode or transcode transformation stages can be displayed on the incoming signal line.

Figure 17:
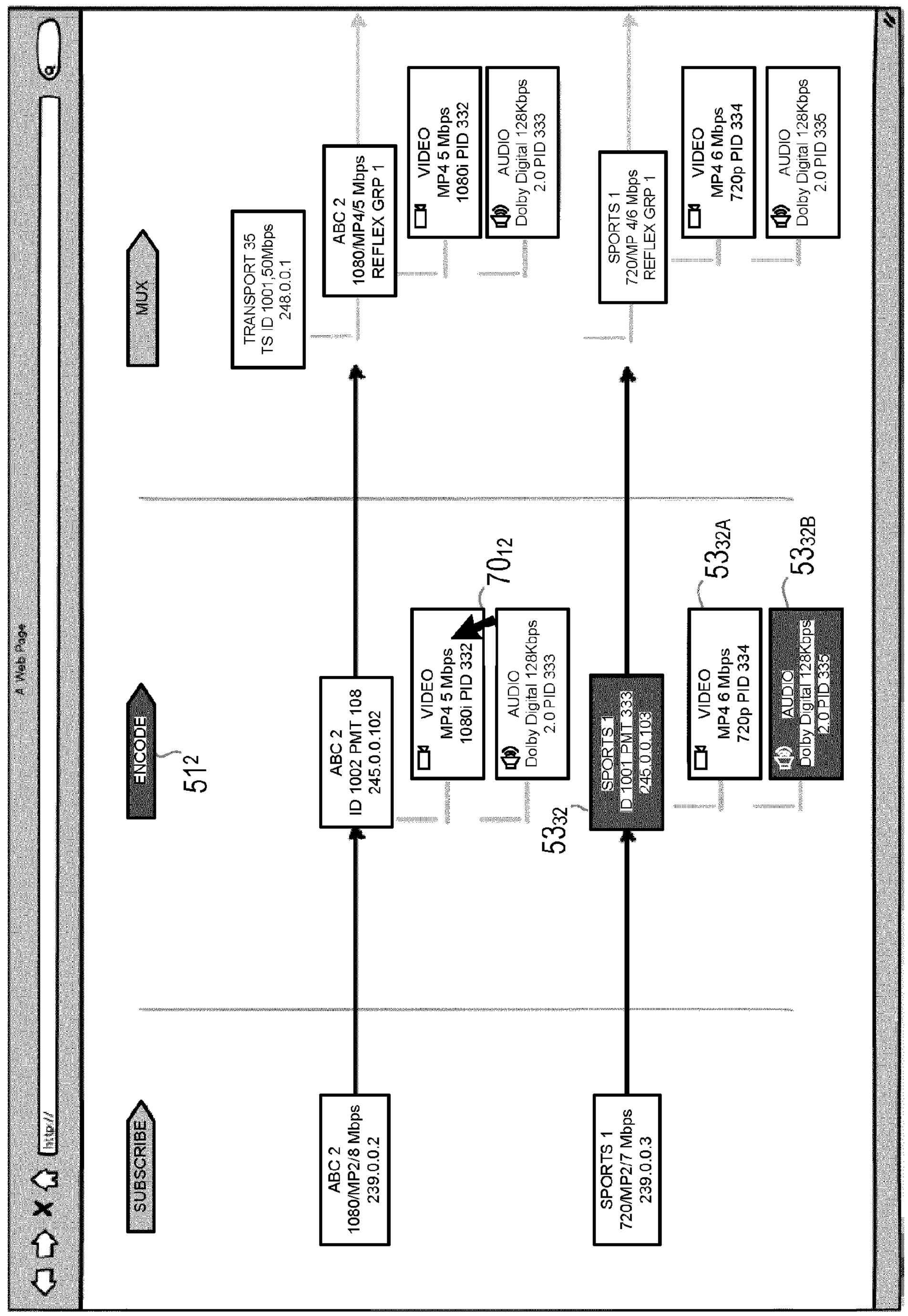
FIG. 17 shows an example of a system view of a user interface according to an embodiment of the invention, and how a user can edit settings.

FIG. 17 illustrates how the system can be configured, in response to receiving a user command $\mathbf{70}_{12}$, to perform editing functions inline within the system view.

Figure 18:
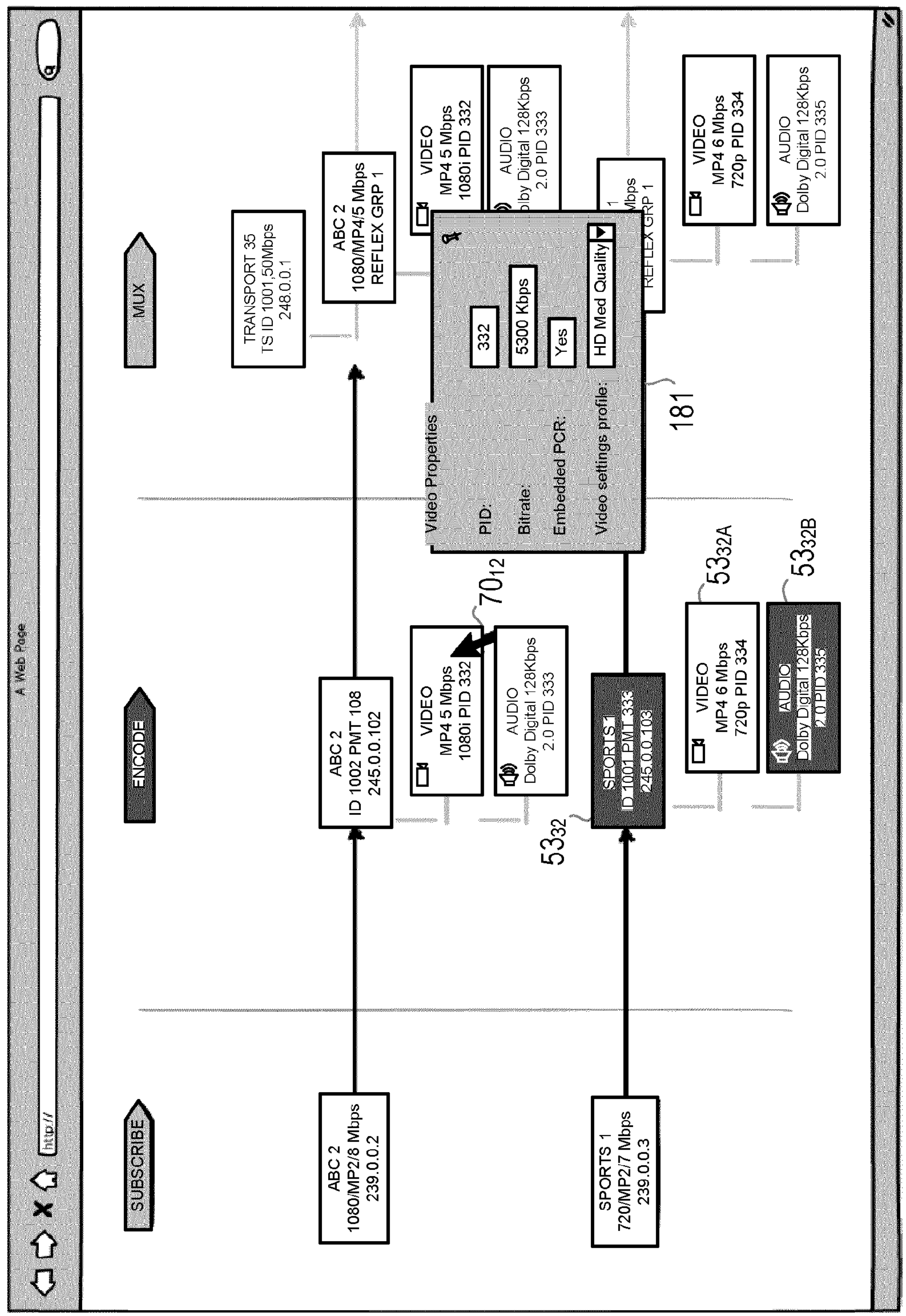
FIG. 18 shows an example of a system view of a user interface according to an embodiment of the invention, and how extended settings can be modified.

For example, as illustrated in FIG. 18, in response to receiving a user command $\mathbf{70}_{12}$ to perform editing functions inline within the system view, for example by clicking, double-clicking or touching the display (or any other way of selecting the signal block in question), expose a properties panel 181 for extended settings to be edited by a user. Thus, according to this arrangement signal block data can be edited inline. This takes the effect of configuring the properties of the signal block in that transformation stage. This can be carried out in response, for example, to receiving a single user-click inside the signal block. The system may be configured, for example, to present the properties panel 181 via a double user-click of a signal block. This allows further properties to be displayed for further configuration options for the signal block.

Figure 19:
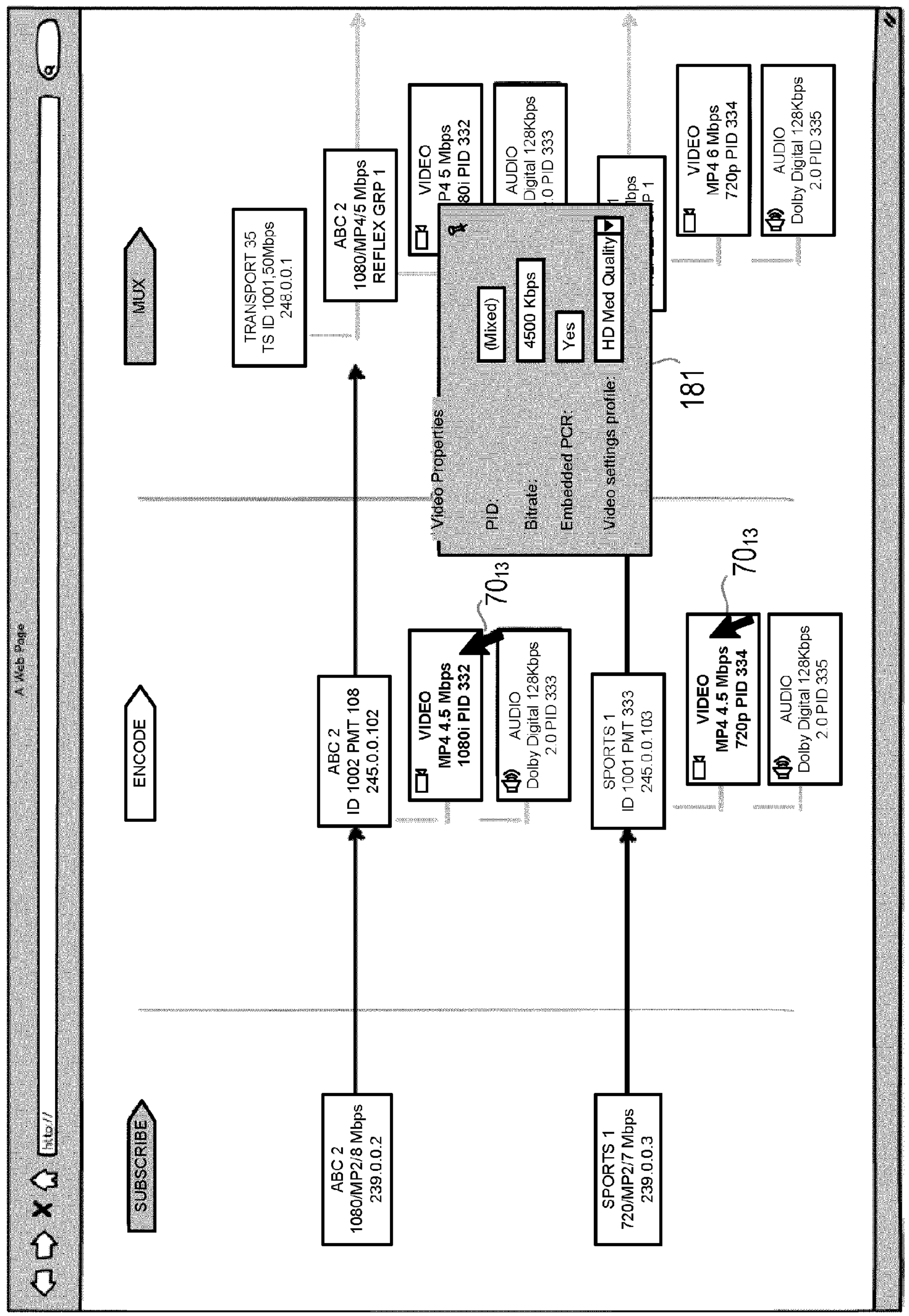
FIG. 19 shows an example of a system view of a user interface according to an embodiment of the invention, and how a user can edit multiple settings.

FIG. 19 illustrates how the system can be configured, in response to receiving user commands $\mathbf{70}_{13}$, to perform multiple selections to enable changes to be made to any two or more signal blocks at a time.

Figure 20:
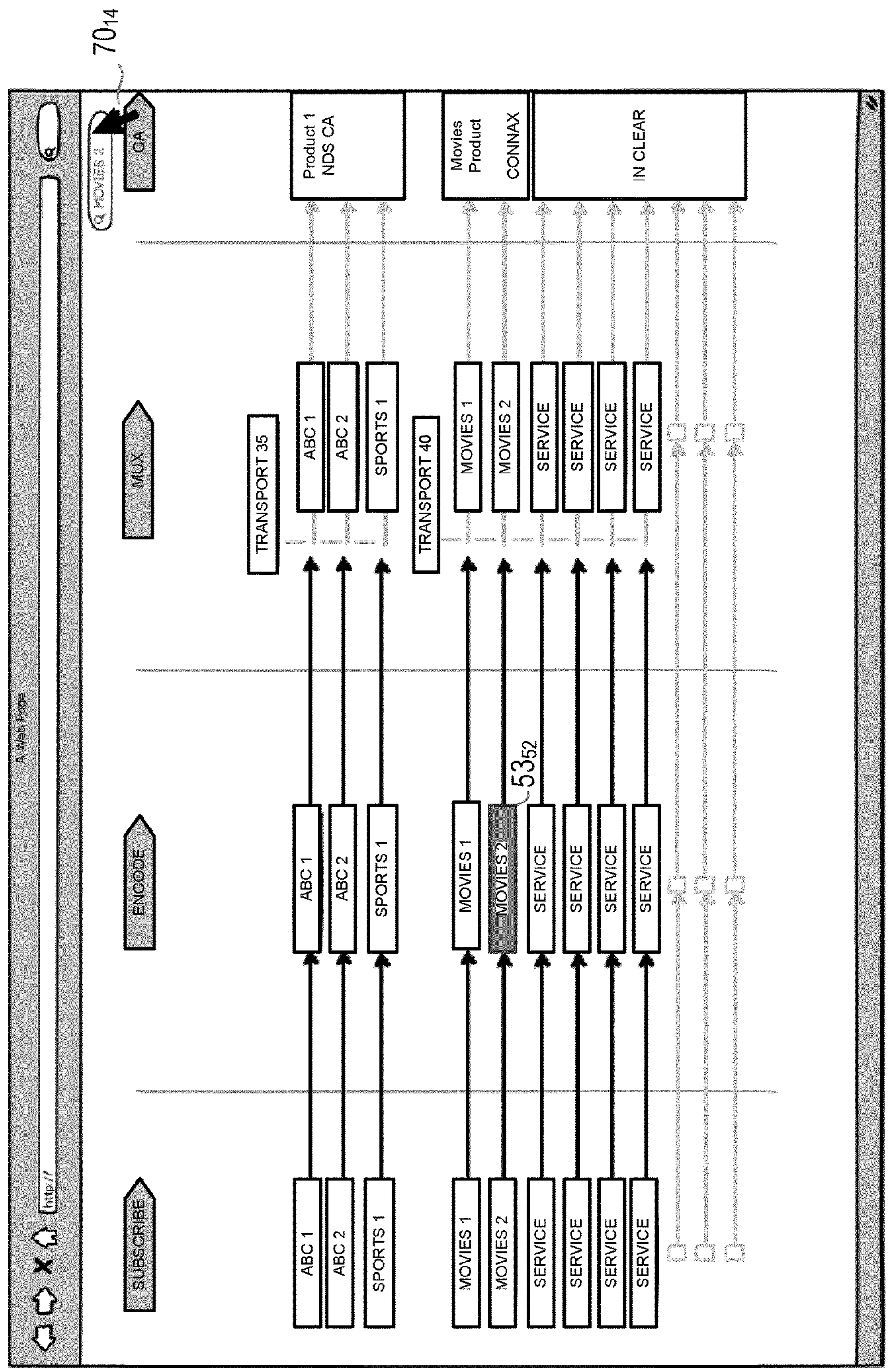
FIG. 20 shows an example of a system view of a user interface according to an embodiment of the invention, and an example of a search and highlight operation.

According to another aspect of the present invention, FIG. 20 shows how a system view can be searched in response to user commands $\mathbf{70}_{14}$. The example shows how a user can search for a specific item in the system view, for example "MOVIES 2" in the example, with the system being configured to then pan to the item, for example signal block $\mathbf{53}_{52}$ if found.

According to this arrangement a user can find an item in the view by using a find edit box, button. Matches to the find text are illustrated in the view by visual effect, for example colorization and border highlighting of matched cells. The user can enumerate to further matches via next or back buttons. In the event that the item is out of view, the system is configured to pan and/or zoom to present the item if found.

Figure 21:
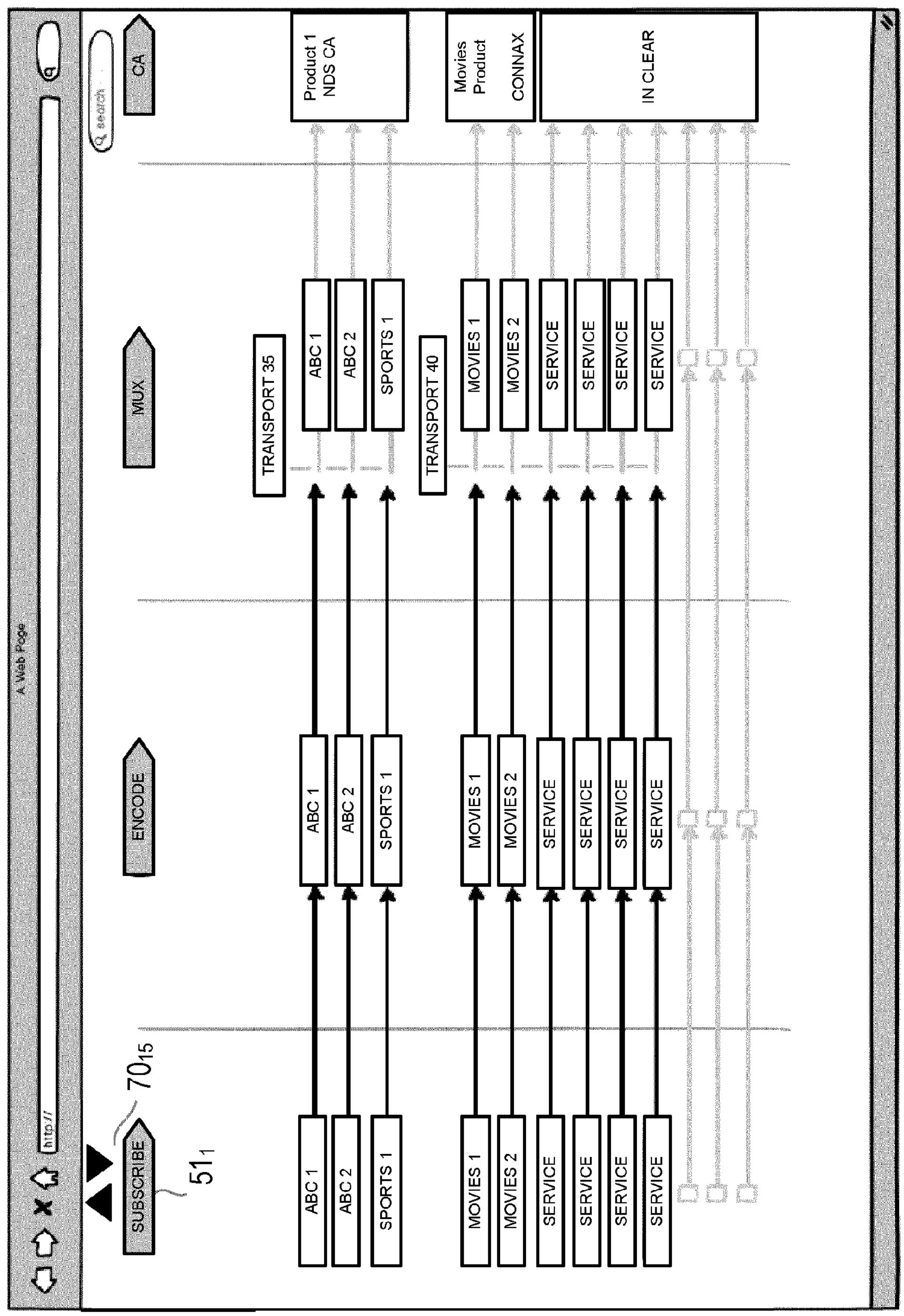
FIG. 21 shows an example of a system view of a user interface according to an embodiment of the invention, and an example of a sort function.

According to another aspect of the present invention, FIG. 21 illustrates how the system can be configured to sort features shown in the system view, in response to receiving a sort command $\mathbf{70}_{15}$ from a user. The sort command can be applied to columns within a specific transform stage, for example within the "subscribe" transform stage $\mathbf{51}_1$ shown in FIG. 21. The system can be configured to sort all items in the system view, or preserve groupings from other transform stages, e.g. a multiplexing transform stage $\mathbf{51}_3$. According to this arrangement, each transform stage can be alpha numeric sorted in an ascending or descending order. The signal blocks in the transform stage are re-arranged in the order (via transition effect) accordingly. The signal flows are re-arranged to match the row from the sorted content. For example, within the subscribe column the data streams can be arranged in one order, but in a different order in the mux column. This effectively corresponds to a secondary sort function whereby a primary sort is performed in one transform stage, and a secondary sort in another transform stage.

Figure 22:
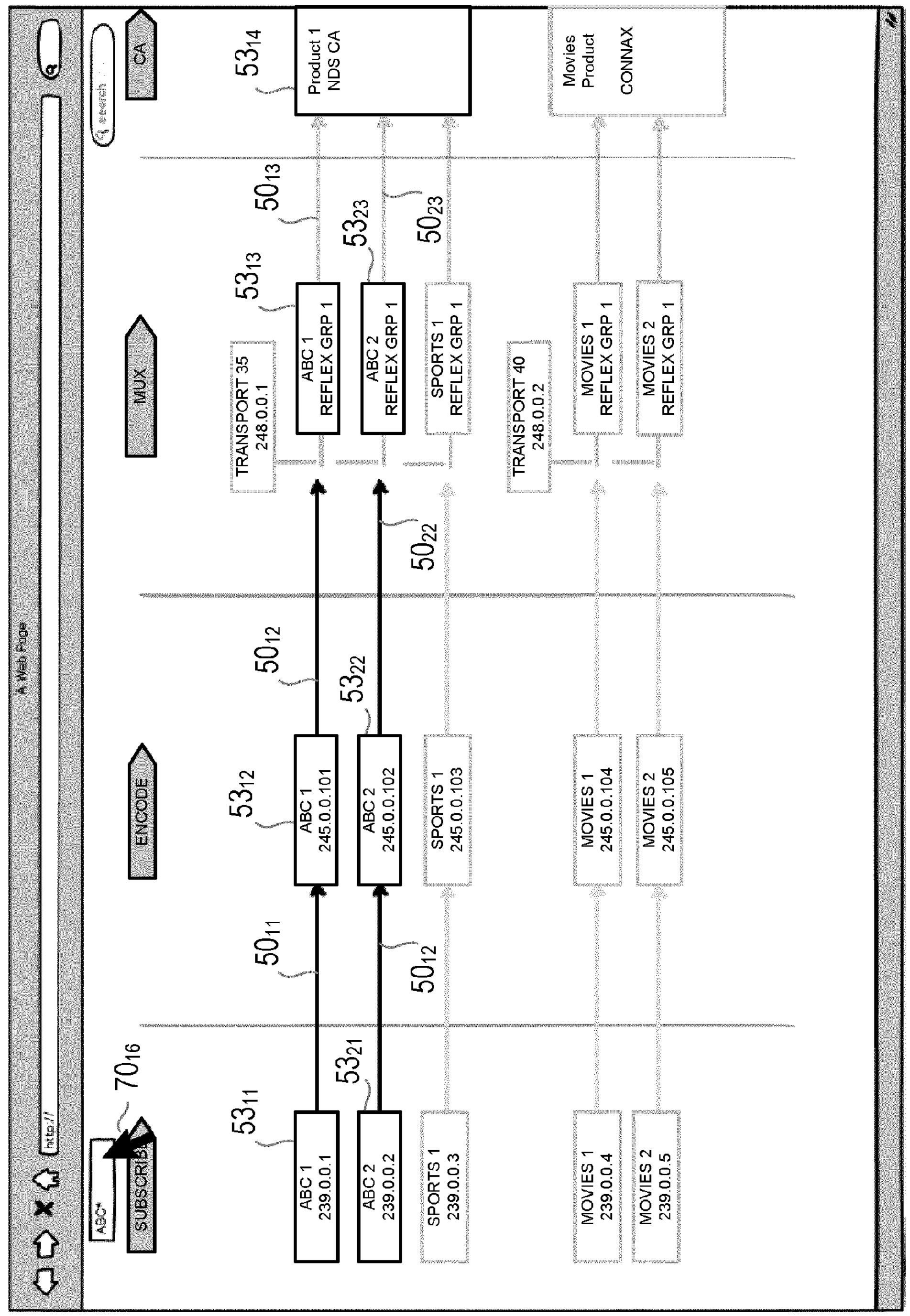
FIG. 22 shows an example of a system view of a user interface according to an embodiment of the invention, and an example of a filter operation.

According to another aspect of the present invention, FIG. 22 illustrates how a the system can be configured to filter the information being displayed, in response to receiving a filter command $\mathbf{70}_{16}$ from a user. The filter command can use wild cards (such as "*"), in order to filter certain categories or groups of signal streams. For example, in FIG. 22 a filter command "ABC*" is used to filter only the signal streams $\mathbf{50}_1$ and $\mathbf{50}_2$ relating to ABC1 and ABC2, respectively, for the system view.

Thus, the step of modifying the system comprises the step of filtering information displayed in a particular view, in response to receiving a filter command from a user. According to such an arrangement the view can be filtered to show signal flows that only match signal blocks or cells that include the filter text. The filter text is entered in a filter edit box. Signal flows that do not match are removed or obfuscated from view (which may be offered as a selectable option to a user).

Figure 23:
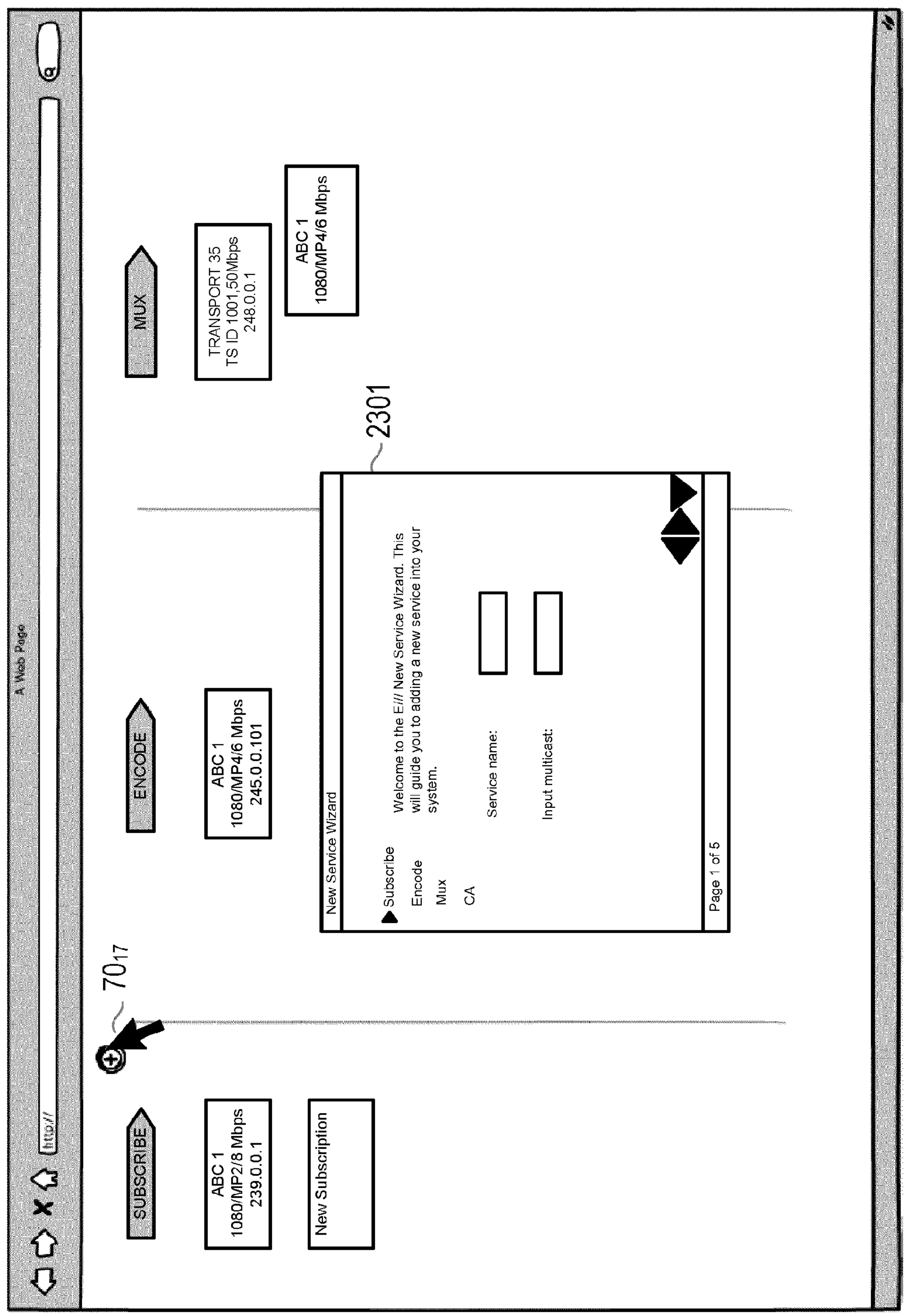
FIG. 23 shows an example of a system view of a user interface according to an embodiment of the invention, and an example of a wizard assist operation.

According to another aspect of the present invention, FIG. 23 illustrates how a the system can be configured to use a wizard assist function 2301 during a set-up procedure, in response to receiving a wizard-assist command $\mathbf{70}_{17}$ from a user. The wizard-assist function assists a user to construct a new signal stream, for example, with various pages in the wizard-assist function relating to different transform blocks of the system view.

Figure 24:
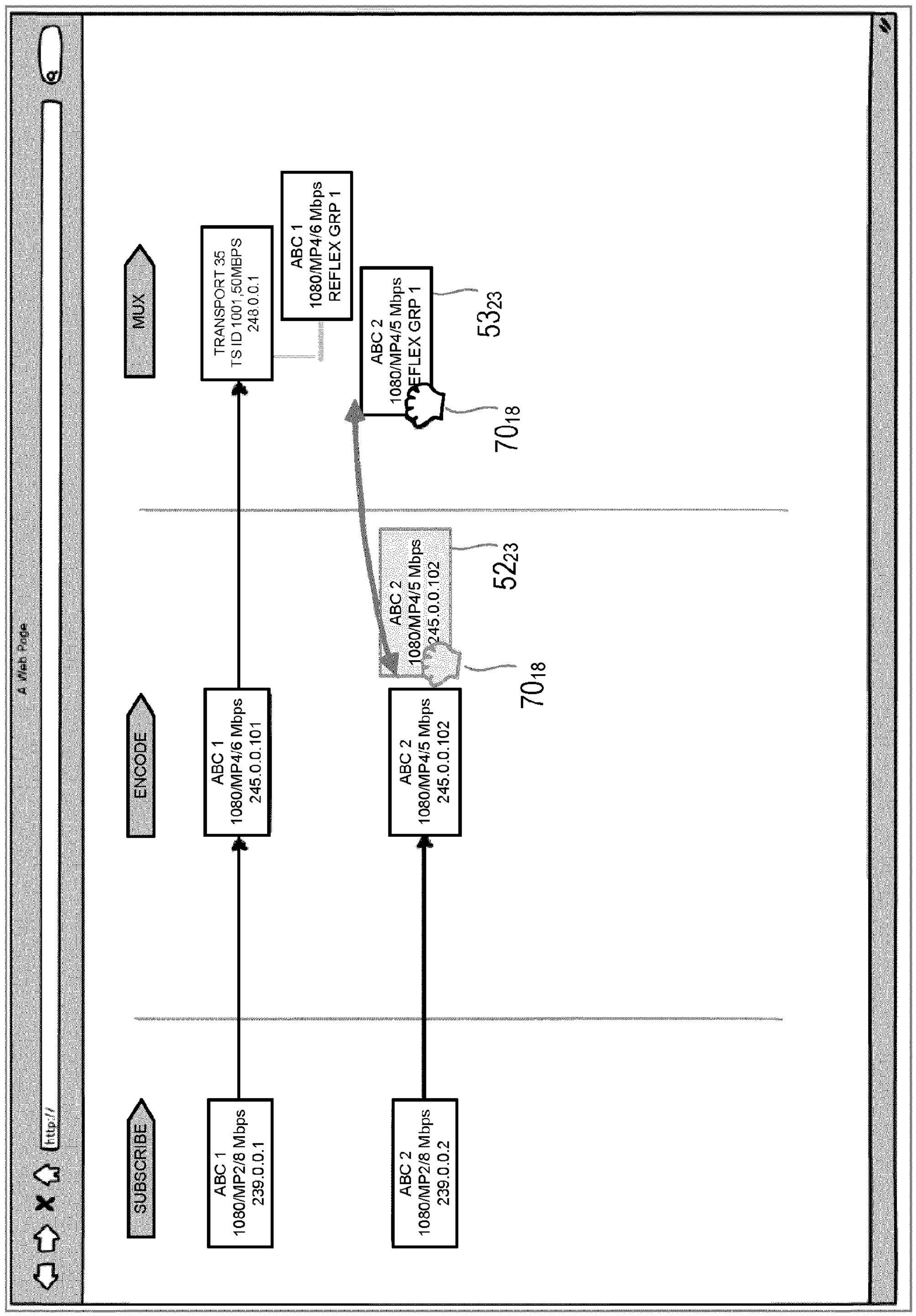
FIG. 24 shows an example of a system view of a user interface according to an embodiment of the invention, and an example of a drag and drop operation.

According to another aspect of the present invention, FIG. 24 illustrates how a the system can be configured to change a representation of a signal stream, in response to receiving a drag-and-drop user command $\mathbf{70}_{18}$ from a user. The drag-and-drop user command enables a user to make changes to a signal path, such as creating new paths, or adding or changing signal blocks within a particular signal path. The drag-and-drop function can be provided as an addition or as an alternative to the wizard-assist function described above.

FIGS. 23 and 24 therefore describe embodiments which further comprise the steps of receiving a user command to edit a system setting, modifying the system setting accordingly, and updating the view of the system based on the modified setting. A system setting may be modified in response to a user selecting a corresponding signal block, and editing the system parameters of that signal block, or a user selecting multiple signal blocks, and editing the system parameters of the multiple signal blocks in parallel.

Figure 25:
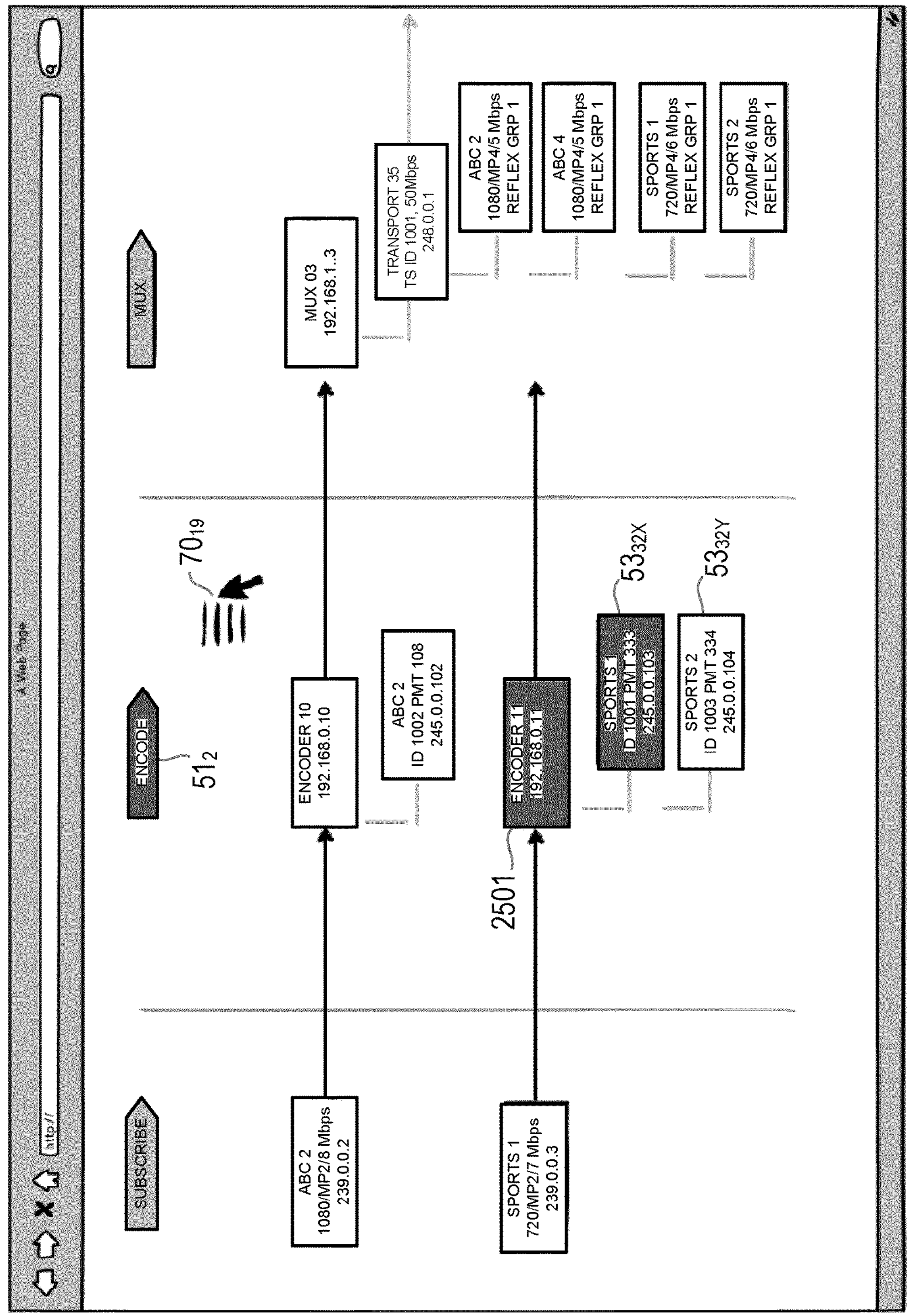
FIG. 25 shows an example of a system view of a user interface according to an embodiment of the invention, and an example of a parent and child illustration.

FIG. 25 illustrates how further layers allow re-arrangement (or transition) of the system view under a hardware centric grouping. For example, the parent of a signal block 2501 is shown as the device, with services carried by that device shown as child system blocks $\mathbf{53}_{32X}$ and $\mathbf{53}_{32Y}$. This type of arrangement allows at least part of the system view to be displayed as an equipment arrangement. Signal blocks or cells in the view are re-arranged (via a transition animation) under a parent signal block which represents the device the transformation of the signal block is being is carried by (for example the device 2501 in FIG. 25).

Figure 26:
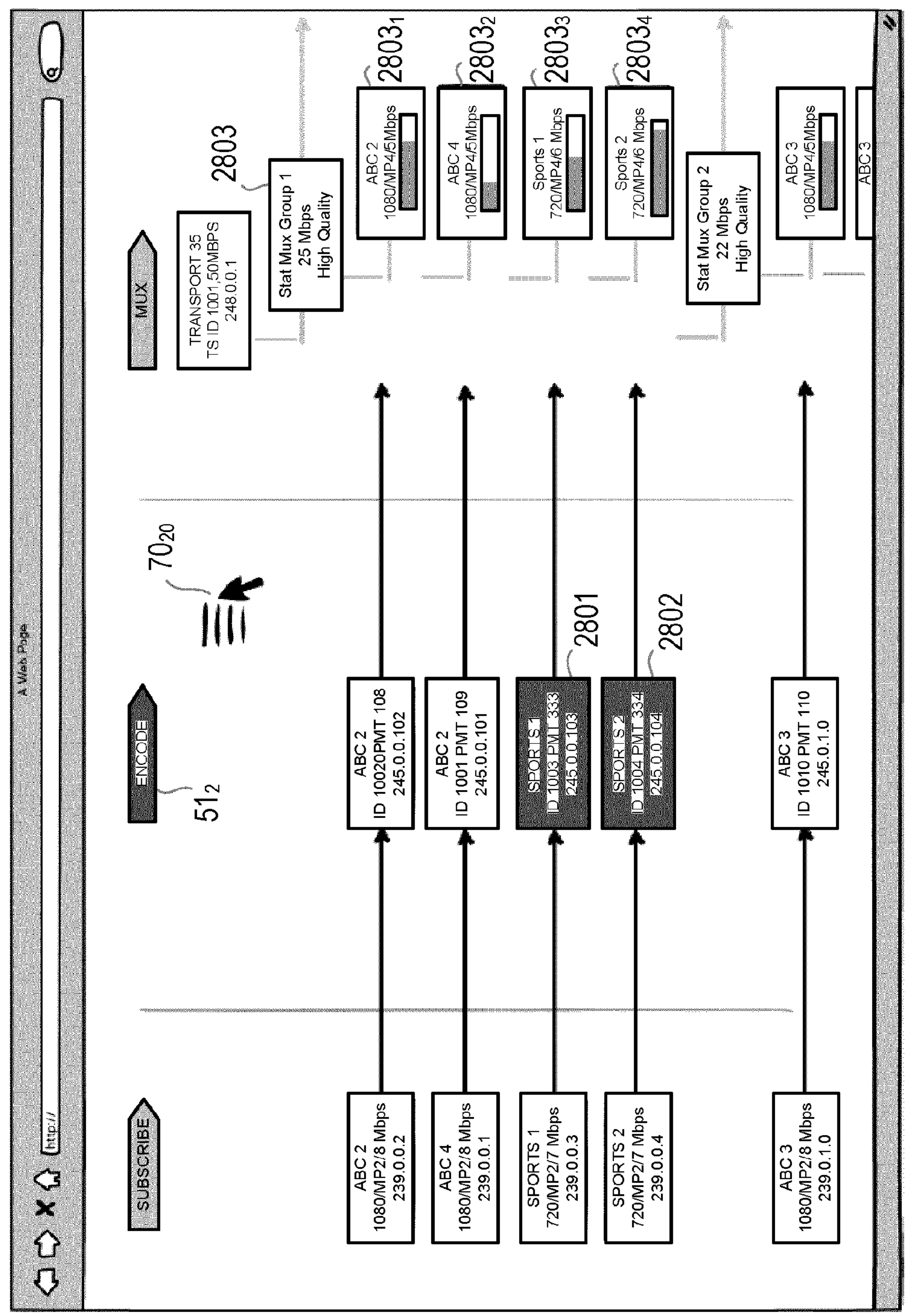
FIG. 26 shows an example of a system view of a user interface according to an embodiment of the invention, and an example of a statistical multiplexer group view.

FIG. 26 illustrates how the system view may be rearranged into statistical multiplexer groups, referred to herein as "Stat Mux" groups, such that the Stat Mux group is the primary grouping, and such that contributing signals into the group are then arranged according to the Stat Mux group. According to statistical multiplexing, services have their video adjusted to variable bitrate on the basis of the quality of picture being encoded. The stat mux group governs the overall bandwidth that the group will be constrained by in terms of bitrate. Stat Mux activity bars can also be displayed to illustrate the activity of each multiplexer. According to this arrangement, signal blocks in the view are re-arranged (via a transition animation) under a parent cell which represents the stat mux group the signal flow is contributing to. In other words, the signal blocks are organised by their relationship of how the services illustrated by the signal blocks are carried in the multiplexer. The multiplexer organises a group of services into a collection called a Transport, the view therefore allows the signal blocks to thus be ordered in the context of the multiplexer Transport grouping or its child 'Stat' multiplexer grouping within the Transport.

Figure 27:
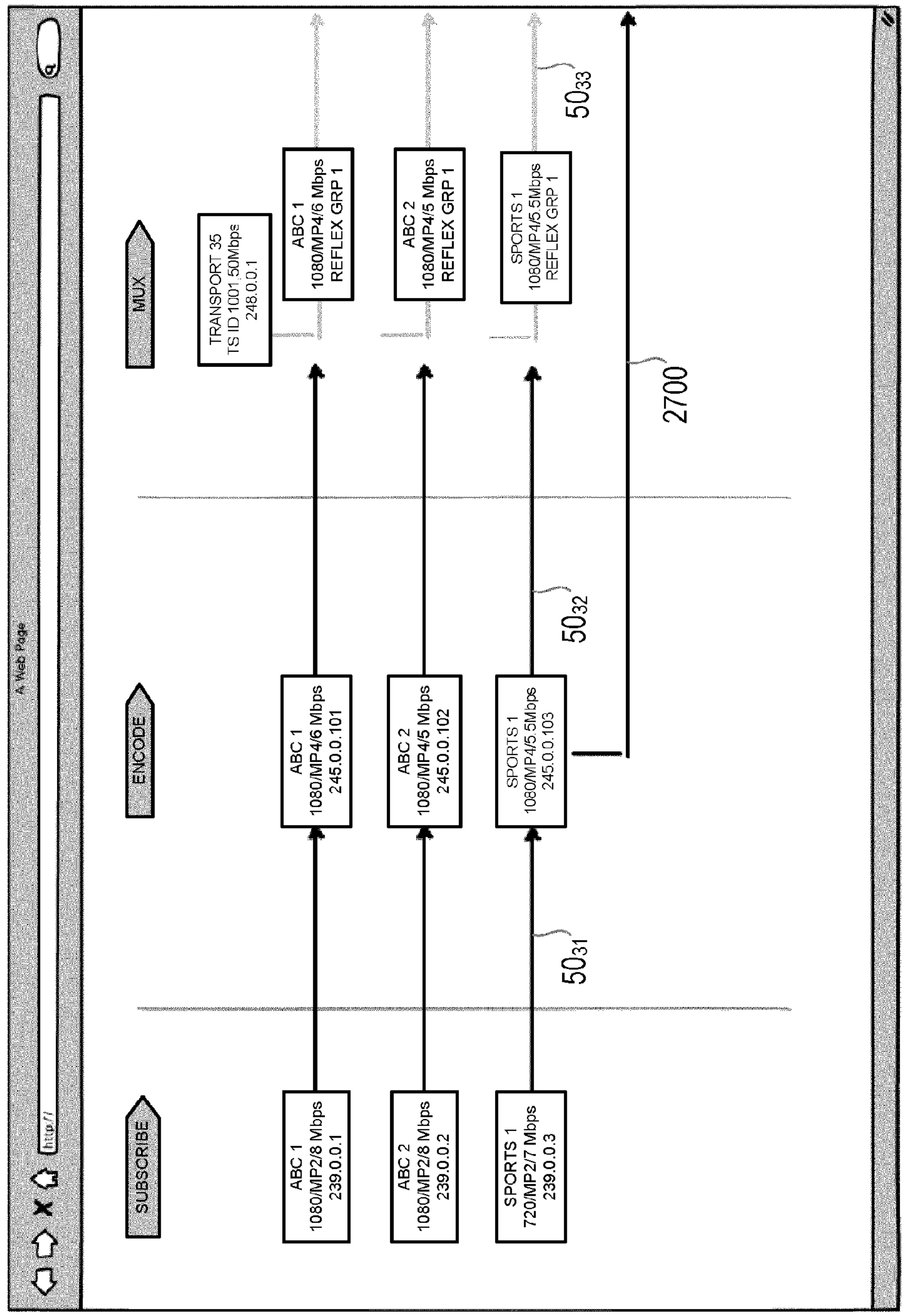
FIG. 27 shows an example of a system view of a user interface according to an embodiment of the invention, and an example of a signal split view.

FIG. 27 illustrates how the system view can be configured to show an additional path 2700, for example where a signal $\mathbf{50}_{32}$ splits (e.g. due to a duplicate path). Thus, where a signal stream or signal path forks, the system view is configured to render this behaviour.

Figure 28:
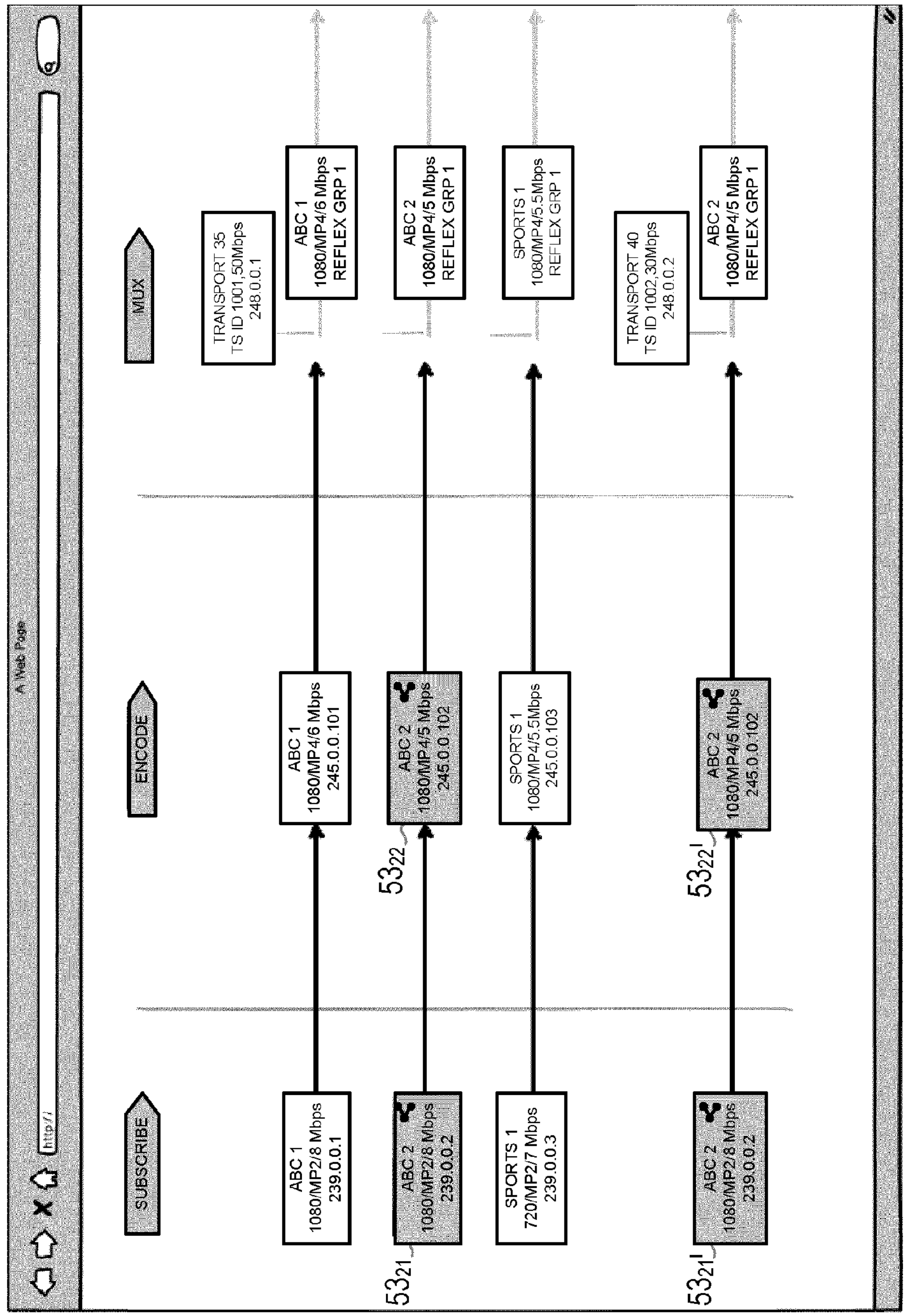
FIG. 28 shows an example of a system view of a user interface according to an embodiment of the invention, and an example of a duplicate path view.

FIG. 28 illustrates how a duplicate path may be presented with a duplicate of the transform stage, thus allowing the system view to preserve groupings within the transform stages (transport being grouped in the example of FIG. 28). For example, in FIG. 28 the signal stream having signal blocks $\mathbf{53}_{21}$ and $\mathbf{53}_{22}$ is shown as having a duplicate path having signal blocks $\mathbf{53}_{21'}$ and $\mathbf{53}_{22'}$. Service ABC 2 is therefore duplicated into two transport duplicate signal blocks, each being marked with a visual indicator, such as a "split icon", and/or for example coloured differently, to indicate that only one actual resource is used for these duplicate paths.

Further details will now be provided about how the system may be configured.

Figure 29:
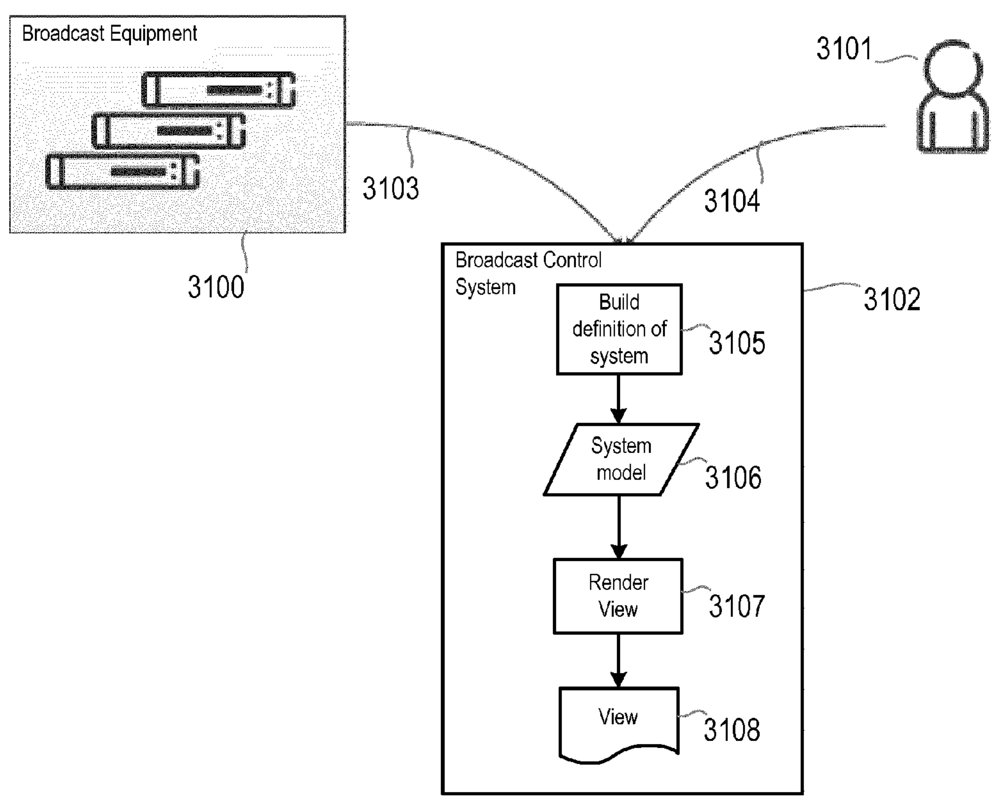
FIG. 29 shows an example of a system according to an embodiment of the invention.

FIG. 29 shows a digital video compression system 3100 (for example a broadcast system) comprising broadcast equipment, for example DVB equipment. FIG. 29 also shows a digital video compression control system 3102, for example a broadcast control system, according to an embodiment of the present invention, and a user 3101.

The digital video compression control system 3102 is configured in step 3105 to build a definition of the system. This may involve importing information 3103 to aid with defining the system. The imported information can include information relating to the resources of the system, the transformation capabilities of those resources, the properties of the system, and the status of the resources within the system. The information may be imported by interrogating the broadcast equipment (i.e. programmatically discovered). The interrogation of the system may involve logging on to the command and control interface of each equipment device in the digital video compression system, and retrieving part or all of the information that is available from said interface. If the information relating to the entire system cannot be obtained in this way, information 3104 from a user 3101 may also be received, to assist with configuring the system.

In step 3106 the digital video compression control system is configured to build a system model, for example by partitioning the system into a plurality of transform stages and signal blocks as described above. In step 3107 the system is configured to render a view of the system model, and in step 3108 present or display the view to a user.

Figure 30:
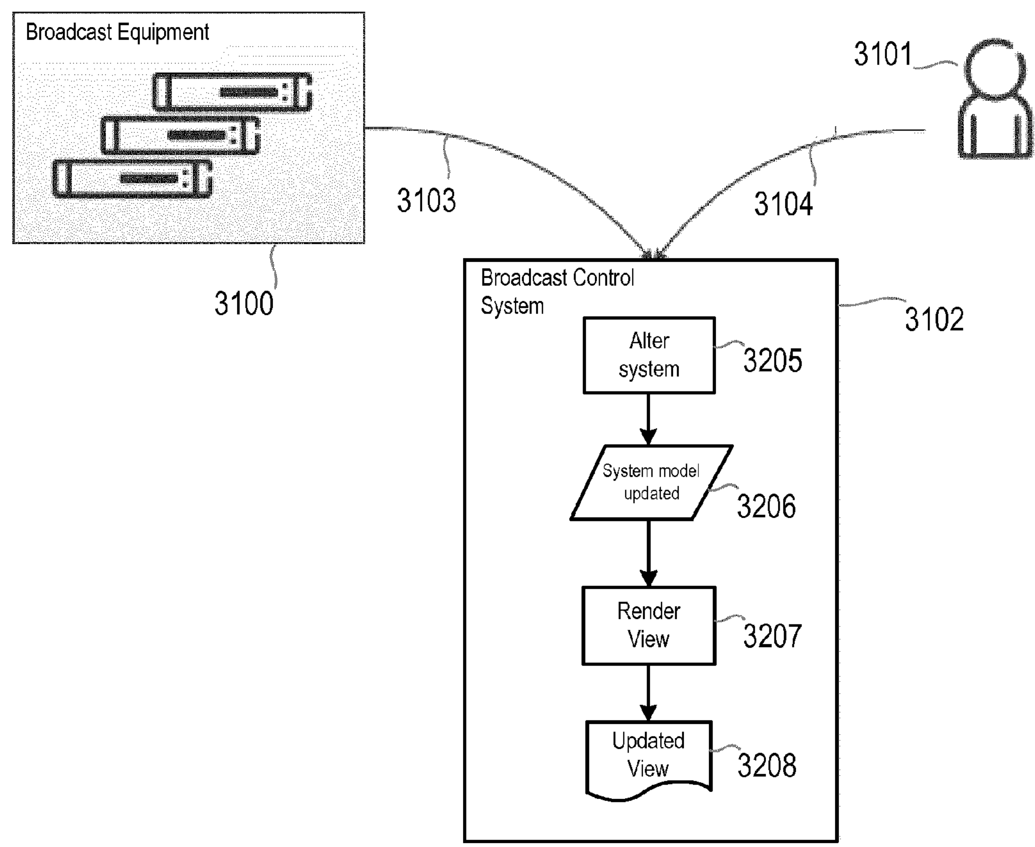
FIG. 30 shows an example of a system according to an embodiment of the invention.

FIG. 30 illustrates that, as a user makes changes to the system or the system itself responds to changes (such as status events), the data model and view of the system is updated. In step 3205 the digital video compression control system is configured to receive information related to the system alteration, either in the form of status or dynamic system change information 3101 from the digital video compression equipment 3100, and/or system configuration information (changes) from a user 3101. In response to the system being altered in step 3205, the system model is then updated in step 3206, for example by partitioning the system into transform stages and signal blocks as described above. In step 3207 the system is configured to render a view of the updated system model, and in step 3208 present or display the updated view to a user.

Figure 31:
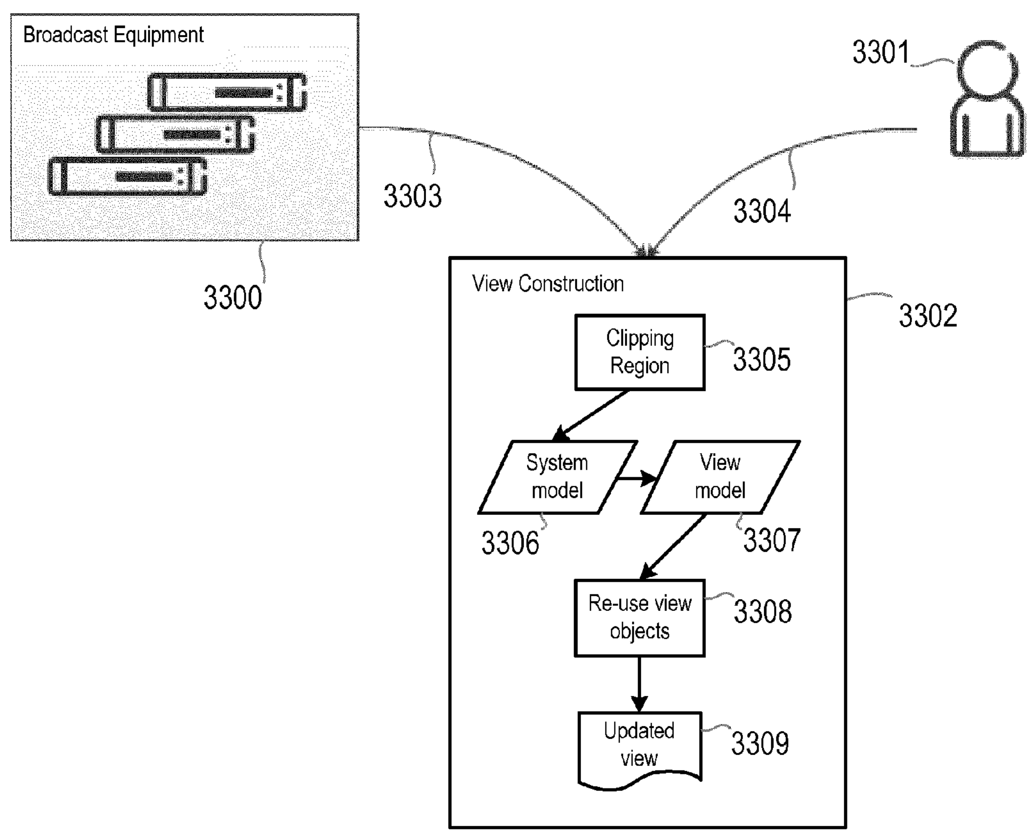
FIG. 31 shows an example of a system according to an embodiment of the invention.

FIG. 31 illustrates how the actual view is a portal into rendering the data model of the system. The actual view renders whichever is the result of the "view model". When a partial view of the system is to be viewed, the clipping region of the system is defined and a "view model" is updated. This process is illustrated in FIG. 31, which shows a functional unit 3302 for constructing a particular view. The functional unit interfaces with the digital video compression or broadcast equipment 3300 to receive status or dynamic changes to the system, and has user interaction 3304 with the user 3301. In step 3305 a clipping region is determined, based on a clipping region selected by a user. In step 3306 a system model is generated, and in step 3307 a view model is generated for the selected clipping region. In step 3308 view objects from the system model are re-used for the view model relating to the clipping region, such that in step 3309 an updated view can be presented relating to the clipping region.

Figure 32:
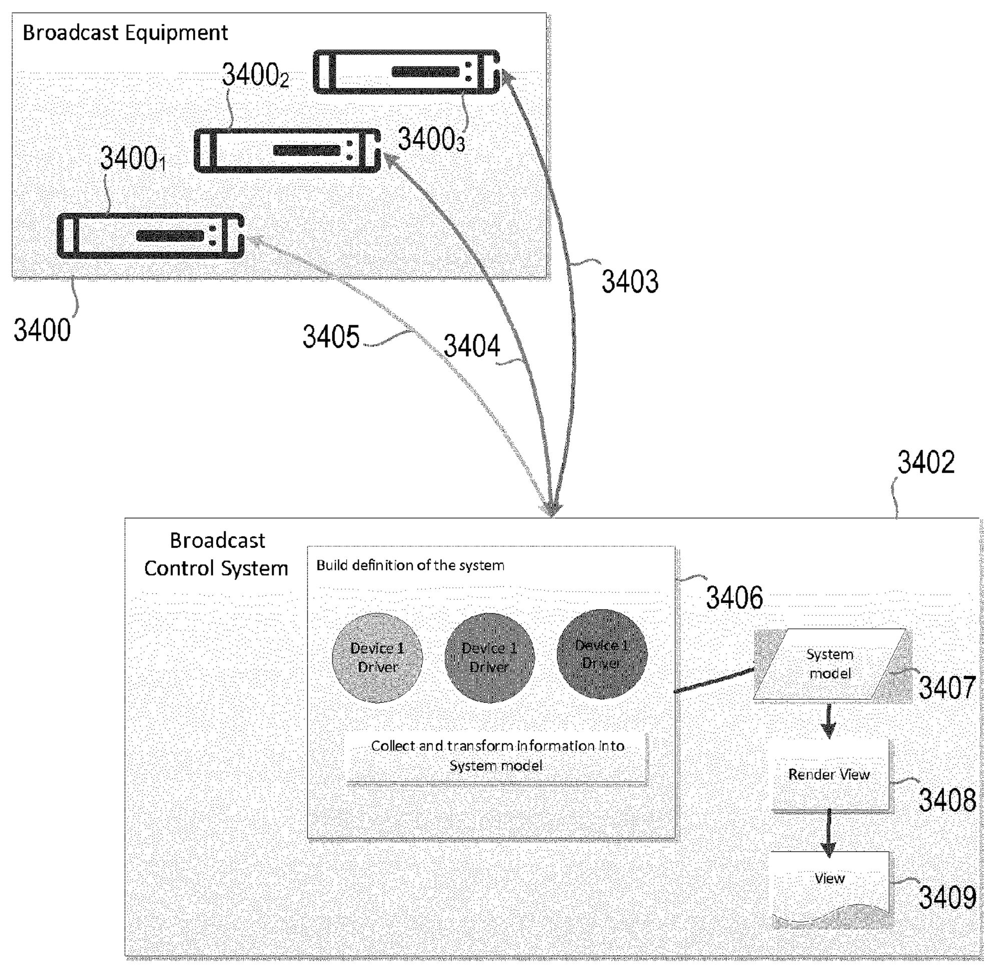
FIG. 32 shows an example of a system according to an embodiment of the invention.

FIG. 32 illustrates how the system can be made to work for a single device or multiple devices, of the same or different types. According to the embodiment of FIG. 32 the digital video compression control system comprises software drivers 3406 that are configured to discover and configure devices within the system for each device type. In the example this involves communicating with a first equipment device $\mathbf{3400}_1$ over a communication link 3405 (for example XML over HTTP), a second equipment device $\mathbf{3400}_2$ over a communication link 3404 (for example HTML over HTTP), and a third equipment device $\mathbf{3400}_3$ over a communication link 3403 (for example Binary over TCP). It is noted that other types of equipment devices and other communication protocols may be used. Each driver understands the command and control protocols of the respective equipment devices $\mathbf{3400}_1$ to $\mathbf{3400}_3$, and thus can supply the system model with the transformation resources available. The digital video compression control system 3402 is configured to generate a system model in step 3407, using the information obtained from the device drivers 3406, render a view of the system in step 3408, and present a view of the system in step 3409.

It is noted that a smaller view simply has fewer drivers which in turn could result in fewer transformation stages in the system. Likewise, a larger view may have more drivers which is turn may result in a greater number of transform stages in the system.

The drivers are configured to communicate with the equipment devices via the device's command and control interfaces. This enables properties and configuration of the devices to be read and written, and also enable the health status of the devises to be determined.

Each driver may understand different types of protocol such as SNMP, XML, TCP, HTTP. Each driver may also have knowledge of the devices content within the protocol and any structure of the data exchange on the protocol.

Thus, from FIGS. 29 to 32 above it can be seen that, according to an embodiment of the invention, the step of receiving system configuration information comprises the step of receiving configuration information relating to equipment devices forming the system. The configuration information may comprise, for example, information relating to the interconnection of the equipment devices, the processing capabilities of the equipment devices, and status information relating to the equipment devices.

The configuration information can be received in response to interrogating the system to automatically determine at least part of the configuration information, and/or receiving at least part of the configuration information from a user. The interrogation of the system may involve logging on to the command and control interface of each equipment device in the digital video compression system, and retrieving part or all of the information that is available from said interface. Information entered manually by a user may include, for example, information relating to interconnection of the equipment devices if this cannot be determined automatically, or other information relating to the equipment devices.

Typically, there will be a limited number of types of users which view the system view according to embodiments of the invention. Each type of user will have different use cases to solve. For example, "Operations-users" are users who are charged with managing the system to ensure it functions correctly. A use case where this view helps is adding or changing the number of services in the system. For example, an Operations-user might be asked to add several services during a 'service window' (for example the early hours of the morning where risk to high value content is limited). The embodiments of the invention allow the Operations-user to make such changes using the improved user interface.

Other types of users are Network and Operations Users. In some Television Service Provider organisations, there are different departments for Networking and Operations. Networking will take overall charge of the underlying IP architecture and Operations the Broadcast/Digital TV equipment. This view could be used by either user during troubleshooting or diagnostics incidents. These are two of a number use cases where a new view helps. A single service centric view that is adjusted and layered helps both use cases by showing the right level of information that the user wishes to see.

In the transform stages of the embodiments described above, a transform stage may be configured to any one or more of the following operations: an encoding operation; a decoding operation; a transcoding operation; a multiplexing or joining operation; a demultiplexing or splitting operation; a scramble or de-scramble operation; and an advertisement insertion operation. It is noted that other transform operations may be performed without departing from the scope of the invention as defined in the appended claims.

Furthermore, it can be seen that embodiments of the invention enable any one or more of the following features to be performed: searching and highlighting an element of the system in response to a search command received from a user; sorting signal blocks within a transform stage in response to a sort command received from a user; setting up a new signal path in response to one or more commands received from a user; copying system parameters from one signal block to another signal block in response to a drag and drop command received from a user; providing an information layer having a parent signal block corresponding to a hardware centric view of an equipment device, with one or more child signal blocks corresponding to services carried by that equipment device; rearranging signal blocks into statistical multiplexer group views; highlighting duplicate signal paths.

The embodiments of the invention enable layers of a system view to be switchable to relay different information to a user. For example, switching between IP and DVB based views or switching between hardware arrangement.

The system view provided by embodiments of the invention is based on the purpose of the system that is being managed, that is, the user interface presents a conceptual model to the user of how signals are passed through transform stages or blocks in the system. Those transform stages are not limited to physical pieces of hardware, but may also comprise software functions, or a combination of both.

The customised views provided by embodiments of the invention separates the transform stages of the system into a horizontal arrangement. Each transform stage can be titled and represents a column of signals that are passing through the transform stage. Signals are represented by a series of cells or signal blocks that are connected to one another. Each signal block or cell contains some data relevant to the signal within the transform stage. An end to end signal through the system is represented by the connected signal blocks across the transform stages (forming a signal flow). Each signal flow can be shown on its own row.

The signal blocks or cells can be arranged with parent/child signal blocks to represent logical relationships of the data. The signal blocks can display images to denote the type of information, e.g. a video icon, audio icon, CA vendor trademark etc. The system view can be panned horizontally and vertically to expose more signal blocks, signal flows or transform stages. This presents the user with the illusion of a portal into a much larger signal map of the system.

The customized view can be zoomed in or out. As the view is zoomed out, data inside the signal block size is reduced and the signal block size is reduced. More signal blocks and signal flows can then be seen. As the view is zoomed in, more data is added to the signal block and the signal block size is increased. Fewer signal blocks and signal flows are displayed.

Panning can be achieved using a mouse pointer whereby the user left mouse clicks the view, holds and moves. The view moves at the same speed of the interaction performed by the user. Panning is also achieved using a touch interface and a single touch swipe gesture and the same operation as the mouse interaction occurs.

Zooming can be achieved using a mouse pointer whereby the user uses a mouse wheel to increase or decrease the zoom (wheel up to increase, wheel down to decrease). If no mouse wheel is present, holding the left CTRL key with a left mouse key held followed by mouse up/mouse down will achieve the same effect. The view zooms at the same speed of the interaction performed by the user. For touch interfaces, pinch gestures are used.

Panning and zooming interactions can be configured to continue after the user interaction has stopped but the effect of the interaction decelerates rapidly over time (a few seconds of inertia). This allows rapid movement around the view.

The data and information included in the signal blocks can be switched to alternative data information by the user clicking layering buttons. Layering buttons can be provided to allow the data to be viewed in different formats that include some or all of the following information.

Service information can include one or more of: service name; service identifier; bitrates of its DVB components; and codecs used. Where appropriate, some Internet Protocol information such as multicast address and port can be made viewable to the user.

Other Internet Protocol information to be made viewable can include one or more of: IP multicast source, destination, UDP/RTP port. The apparatus and method according to embodiments of the invention can also be made to control IP addresses where appropriate.

The embodiments of the invention have the advantage of making it easier to navigate large data sets as the user can pan/zoom to locate data to view/change. This is aided by the manner in which the system view relates to the system purpose as opposed to a hardware centric view. A user can alter the purpose of the system and the signal flows match this. Status and configuration information can also be provided in a single view.

Embodiments of the invention also enable the layering and filtering of data within a single view, using an approach which is consistent with desktop (e.g. mouse) and mobile (e.g. touch) interfaces. Switching between layers causes transition effects as the signal flows are re-arranged. This all helps the user perceive what the system is trying to achieve and thus is easy to manage.

The embodiments of the invention can be used in a maintenance function, whereby a user can add services or make changes to content in a single view by altering layering information and making changes to the system configuration.

The embodiments of the invention can be used in a diagnostics function, whereby a user can see status information within the view and perform remedial action is a more efficient way, for example by: redundancy switching, altering configuration, adding a replacement service etc. An user is also able to see a more direct relationship of the effects of status (health) issues as this relates to the services and signals as opposed to the hardware. However, the view allows those perspectives to be switched within the view to preserve the context that the user is in.

The embodiments of the invention have the advantage of providing a solution whereby a signal is managed across the system in a joined up fashion, and provide a single view of the transform functions across the system. The embodiments of the invention offer an intuitive solution, and therefore simplify the use of the system.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method of providing a user interface for managing a digital video compression system, the method comprising:

receiving system configuration information relating to the digital video compression system being managed;

partitioning the system into a plurality of transform stages, each transform stage representing a transformation that can be performed on a signal stream as a signal stream flows through the system;

representing a signal stream using one or more signal blocks, wherein a signal block contains information relating to a signal stream within a transform stage;

generating a view of the system, wherein the view of the system is represented as one or more signal streams through the system, and one or more signal blocks along each of said signal streams;

modifying the view of the system in response to user commands;

providing a plurality of information layers, wherein a first type of information is displayed in a signal block at a first information layer, and a second type of information is displayed in a signal block at a second information layer;

switching between one or more of information layers and hierarchical layers in response to receiving a user command; and receiving a user command to edit a system setting, modifying the system setting based on the received user command, and updating the view of the system based on the modified setting;

wherein a system setting is modified in response to: a user selecting a corresponding signal block, and editing the system parameters of that signal block; or a user selecting multiple signal blocks, and editing the system parameters of the multiple signal blocks in parallel.

2. The method as claimed in claim 1, wherein the step of generating a view of the system comprises the steps of arranging the transform stages as a series of horizontal stages, and arranging the signal blocks as vertical columns of signal blocks within a transform stage.

3. The method as claimed in claim 1, wherein the step of receiving system configuration information comprises the step of receiving configuration information relating to equipment devices forming the system.

4. The method as claimed in claim 3, wherein the configuration information is received in response to one or more of interrogating the system to automatically determine at least part of the configuration information, and receiving at least part of the configuration information from a user.

5. The method as claimed in claim 1, further comprising the step of providing a plurality of hierarchical layers, wherein a first level of information is displayed in a signal block at a first hierarchical layer, and a second level of information is displayed in a signal block at a second hierarchical layer.

6. The method as claimed in claim 1, wherein the step of modifying the view of the system comprises the step of panning along a path of a signal stream in response to receiving a panning command from a user.

7. The method as claimed in claim 1, wherein the step of modifying the view of the system comprises the step of filtering information displayed in a particular view, in response to receiving a filter command from a user.

8. The method as claimed in claim 1, wherein the step of modifying the view of the system comprises:

switching to display redundancy groups in response to user commands, either by selecting an information layer or selecting a hierarchical layer; or switching to display redundancy protection where no spare equipment devices are available.

9. The method as claimed in claim 1, wherein the step of modifying the view of the system comprises:

using different information layers to represent a different level of operational efficiency of a signal block, and highlighting a signal block having an operational efficiency which is below a threshold value; or displaying video thumbnails of one or more signal streams.

10. The method as claimed in claim 1, further comprising any one or more of the steps of:

searching and highlighting an element of the system in response to a search command received from a user;

sorting signal blocks within a transform stage in response to a sort command received from a user;

setting up a new signal path in response to one or more commands received from a user;

copying system parameters from one signal block to another signal block in response to a drag and drop command received from a user;

providing an information layer having a parent signal block corresponding to a hardware centric view of an equipment device, with one or more child signal blocks corresponding to services carried by that equipment device;

rearranging signal blocks into statistical multiplexer group views; and highlighting duplicate signal paths.

11. The method as claimed in claim 1, wherein a transform stage is configured to perform any one or more of the following operations:

an encoding operation;

a decoding operation;

a transcoding operation;

a multiplexing or joining operation;

a demultiplexing or splitting operation;

a scramble or de-scramble operation; and an advertisement insertion operation.

12. The method as claimed in claim 1, wherein a signal block comprises information including any one or more of:

a service identifier for identifying the service being provided by a signal stream;

equipment device information identifying the transform operation being performed on the signal stream by one or more equipment devices; and internet protocol multicast information for the signal stream.

13. An apparatus for providing a user interface for managing a digital video compression system, the apparatus comprising:

a receiving unit adapted to receive system configuration information relating to the digital video compression system being managed;

a processing unit configured to: partition the system into a plurality of transform stages, each transform stage representing a transformation that can be performed on a signal stream as a signal stream flows through the system;

represent a signal stream using one or more signal blocks, wherein a signal block contains information relating to a signal stream within a transform stage;

generate a view of the system, wherein the view of the system is represented as one or more signal streams through the system, and one or more signal blocks along each of said signal streams;

modify the view of the system in response to user commands;

provide a plurality of information layers, wherein a first type of information is displayed in a signal block at a first information layer, and a second type of information is displayed in a signal block at a second information layer;

switch between one or more of information layers and hierarchical layers in response to receiving a user command; and receive a user command to edit a system setting, modifying the system setting based on the received user command, and updating the view of the system based on the modified setting;

wherein a system setting is modified in response to: a user selecting a corresponding signal block, and editing the system parameters of that signal block; or a user selecting multiple signal blocks, and editing the system parameters of the multiple signal blocks in parallel.

* * * * *